(12) United States Patent
Bozhevolnyi et al.

(10) Patent No.: US 6,782,179 B2
(45) Date of Patent: Aug. 24, 2004

(54) SURFACE PLASMON POLARITON BAND GAP STRUCTURES

(75) Inventors: Sergey Bozhevolnyi, Aalborg (DK); John Erland Østergaard, Bagsværd (DK)

(73) Assignee: Micro Managed Photons A/S, Roskilde (DK)

( * ) Notice: Subject to any disclaimer, the term of this patent is extended or adjusted under 35 U.S.C. 154(b) by 74 days.

(21) Appl. No.: 09/908,649

(22) Filed: Jul. 20, 2001

(65) Prior Publication Data

US 2002/0021445 A1 Feb. 21, 2002

Related U.S. Application Data

(60) Provisional application No. 60/243,418, filed on Oct. 27, 2000, and provisional application No. 60/219,662, filed on Jul. 21, 2000.

(51) Int. Cl.[7] ................................................. G02B 6/00
(52) U.S. Cl. ...................... 385/131; 385/130; 385/129; 356/445
(58) Field of Search ........................... 385/1, 2, 14, 39, 385/40, 129, 130, 131; 356/445

(56) References Cited

U.S. PATENT DOCUMENTS 4,556,790 A * 12/1985 Glass et al. ................. 257/431
4,565,422 A    1/1986 Seymour et al.

(List continued on next page.)

OTHER PUBLICATIONS

Barnes, "Electromagnetic Crystals for Surface Plasmon Polaritons and the Extraction of Light from Emissive Devices," Journal of Lightwave Technology, vol. 17, No. 11, pp. 2170–2182, Nov. 1999.

(List continued on next page.)

*Primary Examiner*—Michael P. Stafira
*Assistant Examiner*—Juan D Valentin, II
(74) *Attorney, Agent, or Firm*—Harness Dickey

(57) ABSTRACT

The present invention provides a method and devices for controlling the propagation of Surface Plasmon Polaritons (SPPs) using Surface Plasmon Polariton Band Gap (SPPBG) regions. The SPPBG regions are regions of one or more interfaces supporting the propagation of SPPs on which SPPs experience a periodic modulation of the dielectric properties of the media into which its electromagnetic field extend. The frequency range of the band gap is determined by the period of the modulation. SPPBG regions prohibit propagation of SPPs having a frequency within its band gap.

By forming transmitting regions in the SPPBG regions the present invention provides ultra-compact SPP waveguides. The present invention can be utilised to form compact integrated SPP/optical circuits. Also, the present invention provides cavities supporting standing SPP-waves for field localisation. Such field localisation can provide very high field intensities and can be used in various sensor applications.

The devices of the present invention provide a number of advantages over photonic components since SPPs propagates on 2-dimensional interfaces, and only confinement in the plane of propagation is needed. This allows for a very simple production of the devices according to the present invention.

45 Claims, 14 Drawing Sheets

U.S. PATENT DOCUMENTS

| | | | |
|---|---|---|---|
| 4,568,147 A | | 2/1986 | Seymour et al. |
| 4,583,818 A | | 4/1986 | Chen et al. |
| 4,765,705 A | * | 8/1988 | Seymour et al. .............. 385/37 |
| 4,815,843 A | * | 3/1989 | Tiefenthaler et al. ......... 385/36 |
| 4,915,482 A | | 4/1990 | Collins et al. |
| 5,067,788 A | * | 11/1991 | Jannson et al. ................ 385/2 |
| 5,073,725 A | * | 12/1991 | Takano et al. .............. 385/130 |
| 5,075,796 A | * | 12/1991 | Schildkraut et al. ........... 385/8 |
| 5,157,537 A | * | 10/1992 | Rosenblatt ..................... 385/3 |
| 5,337,183 A | * | 8/1994 | Rosenblatt ................... 385/37 |
| 5,455,178 A | * | 10/1995 | Fattinger ..................... 385/12 |
| 5,598,267 A | | 1/1997 | Sambles et al. |
| 5,625,729 A | * | 4/1997 | Brown ........................ 385/31 |
| 5,917,607 A | | 6/1999 | Naya |
| 6,034,809 A | * | 3/2000 | Anemogiannis ............... 385/2 |
| 6,408,123 B1 | * | 6/2002 | Kuroda et al. ............. 385/130 |
| 6,469,785 B1 | * | 10/2002 | Duveneck et al. ............ 385/12 |

OTHER PUBLICATIONS

Glasberg et al., "Long–range surface plasmon resonances in grating–waveguide structures," Appl. Phys. Lett., vol. 70, No. 10, pp. 1210–1212, Mar. 10, 1997.

Kitson et al., "Full Photonic Band Gap for Surface Modes in the Visible," Physical Review Letters, vol. 77, No. 13, pp. 2670–2673, Sep. 23, 1996.

Kitson et al., "Photonic band gaps in metallic microcavities," Journal of Applied Physics, vol. 84, No. 5, pp. 2399–2403, Sep. 1, 1998.

Scherer et al., "Guest Editorial Electromagnetic Crystal Structures, Design, Synthesis, and Applications," Journal of Lightwave Technology, vol. 17, No. 11, pp. 1928–1930, Nov. 1999.

Smolyaninov et al., "Experimental study of surface–plasmon scattering by inidividual surface defects," Physical Review B, vol. 56, No. 3, pp. 1601–1611, Jul. 15, 1997.

Smolyaninov et al., "Near–field optical microscopy of two–dimensional photonic and plasmonic crystals," Physical Review B, vol. 59, No. 3, pp. 2454–2460, Jan. 15, 1999.

Barnes, W.L. et al., "Photonic surfaes for surface–plasmon polaritons," J. Opt. Soc. Am. A, vol. 14, No. 7, Jul. 1997, pp. 1654–1661.

Bozhevolnyi, Sergey et al., "Two–Dimensional Micro–Optics of Surface Plasmons," Physical Review Letters, vol. 78, No. 14, Apr. 7, 1997, pp. 2823–2826.

Bozhevolnyi et al., "Elastic scattering of surface plasmon polaritons: Modeling and experiment," Physical Review B, vol. 58, No. 16, Oct. 5, 1998, pp. 10 899—10 910.

Bozhevolnyi, "Localization phenomena in elastic surface–polariton scattering caused by surface roughness," Physical Review B, vol. 54, No. 11, Sep. 15, 1996, pp. 8177–8185.

Bozhevolnyi et al., "Observation of propagation of surface plasmon polaritons along line defects in a periodically corrugated metal surface," Optics Letters, vol. 26, No. 10, May 15, 2001.

Bozhevolnyi et al., "Waveguiding in Surface Plasmon Polariton Band Gap Structures," Phsical Review Letters, vol. 86, No. 14, Apr. 2, 2001, pp. 3008–3011.

* cited by examiner

SURFACE PLASMON POLARITON BAND GAP STRUCTURES

This nonprovisional application claims priority under 35 U.S.C. § 119(e) on U.S. Provisional Application No. 60/219,662 filed on Jul. 21, 2000, and U.S. Provisional Application No. 60/243,418 filed on Oct. 27, 2000, which are herein incorporated by reference.

FIELD OF THE INVENTION

The present invention provides a method and devices for controlling the propagation of Surface Plasmon Polaritons (SPPs) using Surface Plasmon Polariton Band Gap (SPPBG) regions. The SPPBG regions are regions of one or more interfaces supporting the propagation of SPPs on which SPPs experience a periodic modulation of the dielectric properties of the media into which its electromagnetic field extend. The frequency range of the band gap is determined by the period of the modulation. SPPBG regions prohibit propagation of SPPs having a frequency within its band gap.

By forming transmitting regions in the SPPBG regions the present invention provides ultra-compact SPP waveguides. The present invention can be utilised to form compact integrated SPP/optical circuits. Also, the present invention provides cavities supporting standing SPP-waves for field localisation. Such field localisation can provide very high field intensities and can be used in various sensor applications.

The devices of the present invention provide a number of advantages over photonic components since SPPs propagates on 2-dimensional interfaces, and only confinement in the plane of propagation is needed. This allows for a very simple production of the devices according to the present invention.

BACKGROUND OF THE INVENTION

Surface plasmon polaritons are quasi-two-dimensional electromagnetic (EM) modes propagating along an interface between a conducting and a dielectric material. FIG. 1 shows an SPP propagating along the interface 4 between metal 2 and air 5. The EM field amplitudes 6 decay exponentially in both neighbouring media in the directions perpendicular to the interface 4, as illustrated in FIG. 1.

Typically, SPPs are excited by matching the propagation of electromagnetic radiation from a laser beam to the propagation constant β of the SPP whereby the EM field can be coupled to SPPs. FIG. 1 shows a schematic representation of the SPP excitation in the Kretschmann configuration at a glass-metal interface 1 or an air-metal interface 4 of a metal film 2 deposited on a glass substrate 3. The angle of incidence θ of the light through a glass prism 7 on the backside of the glass substrate 3 should be adjusted to satisfy the phase matching condition: $\beta=(2\pi/\lambda) n \sin\theta$, where n is the glass refractive index. The exact phase matching conditions determine which interface the plasmon is coupled to, but as the metal film 3 is typically much thinner than the transverse extension of the field amplitude 6, the SPP can be considered as primarily propagating in the dielectric layers 3 and/or 5 and following the metal-dielectric interface 2 and/or 4.

Several methods and devices for performing this coupling are known; e.g. prism couplers as illustrated in FIG. 1 or described in U.S. Pat. No. 4,565,422 and grating couplers such as described in U.S. Pat. No. 4,567,147 and U.S. Pat. No. 4,765,705. The propagating SPPs can be converted back to photons again by making use of a similar device.

Some simple optical elements able to govern SPP propagation have been suggested by Smolyaninov et al. (Phys. Rev. B 56, 1997, 1601). These elements utilise diffraction and refraction of SPPs on surface defects according to the Huygens-Fresnel principle.

The existence of surface plasmon polariton band structure have been mentioned in a number of articles such as Scherer et al. (Journal of Lightwave Technology 17, 1999, 1928); Smolyaninov et al. (Phys. Rev. B 59, 1999, 2454); and Kitson et al. (1996) (Phys. Rev. Lett. 77, 1996, 2670). Such band structures arise from periodic structures fabricated at a metal-dielectric interface. When the excited SPP propagate along the periodic structure, the SPP propagation constant is periodically modulated resulting eventually in a "plasmonic band gap" effect.

Plasmonic band gaps structures in 2-dimensional crystals have been reported by Kitson et al (1996). The article describes the coupling of photons to SPPs on a textured interface using a prism as described in relation to FIG. 1 of the present description, the texture describing a periodic hexagonal pattern. The reflection of the incident laser beam is a measure of the coupling of photons to SPPs on the interface and FIG. 3 of the article illustrates the resulting reflectivity of the coupling region. Thus, FIG. 3 shows that for photons having energy in the interval 1.91–2.00 eV, there is a poor coupling of photons to SPPs illustrating a plasmonic band gap for the corresponding SPPs.

A further article by Kitson et al. (J. Appl. Phys., 84, 1998, 2399) relates to reducing losses in microcavities using metallic mirrors (e.g. organic LEDs). The article proposes a method to avoid losses due to non-radiative coupling from microcavity modes to SPP modes in the metal mirrors. Using textured mirror surfaces, a band gap may be introduced, which prohibit coupling to SPPs having energies within the band gap (the prohibition of this coupling is described in detail in the article by the same authors in the previous section, Kitson et al. (1996)). Tuning the band gap to the microcavity mode will thereby reduce the coupling losses of the microcavity mode. The article describes a microcavity with a one-dimensional texturing of one of the metal mirrors.

Photonic band-gap (PBG) materials have been used for providing wave guiding, light localisation, low losses for bending and strong wavelength dependent light transmission. The photonic band gap effect relies on periodic scattering of light by a wavelength scale periodic structure of scatters similar to the effect experienced by electrons in atomic lattices, namely that the photon/electron energies are arranged into energy bands separated by gaps in which propagation states are prohibited. Existing PBG-based structures utilises 3-dimensional periodic structures which are typically difficult to fabricate and have so far very little design flexibility. Also, existing planar PBG based waveguides have high optical losses in the out of plane dimension.

SUMMARY OF THE INVENTION

It is an object of the invention to provide a method and a device for guiding and localisation of electromagnetic radiation.

It is another object of the invention to provide a substantially 2-dimensional structure for guiding of electromagnetic radiation.

It is a further object of the invention to provide compact and low loss integrated optical circuits comprising passive and active components such as waveguides, bends, splitters, couplers, filters, multiplexers, de-multiplexers, interferometers, resonators, sensors, tuneable filters, amplifiers, switches, sensors, etc.

It is a still further object of the invention to provide compact and low loss integrated optical circuits, which can process signals faster than known optical circuits due to their smaller size.

It is a still further object of the invention to provide compact and low loss integrated optical circuits, which are easy and cheap to fabricate.

It is a still further object of the invention to provide localised high intensity electromagnetic fields for use in sensor applications.

The present invention fulfil these objects by providing a method and a device providing a controlled propagation of Surface Plasmon Polaritons (SPPs) in Surface Plasmon Polariton Band Gap (SPPBG) structures. By leaving channels in SPPBG structures free from periodic modulation, the present invention provides ultra-compact waveguides in SPPBG structures, that is, an energy/frequency dependent guiding of the SPPs which can be utilised to form compact integrated SPP/optical circuits.

Thus, the present invention is based on processing light signals in a 2-dimensional system by guiding and/or localising corresponding SPP fields. The coupling of light signals to interface propagating EM fields (SPPs) can be done with a close to 100% conversion efficiency in a thin conducting film using gratings or prism couplers. The SPPs have a wavelength very similar to that of photons and the same signal processing opportunities using band gap effects can be utilised.

It is an important property of SPPs that the EM field is constrained to propagate along the conductor-dielectric interface(s), wherefore an SPP component can be considered a 2-dimensional system. However, it is an equally important property of SPPs that the EM field extends into the dielectric material above and/or below the 2-dimensional interface, wherefore the SPP propagation depends on the properties of the dielectric material (if the metal layer is thin, the fields extends into dielectric materials on both sides of the layer). Therefore the properties in relation to scattering are different for SPPs as compared to photons. A scattering centre in the interface interacting with an SPP may result in a scattered EM field propagating away from the interface as photons, or stay at the interface as an SPP. If scattering of a beam of SPPs results in coupling EM radiation to a mode, which is not directly coupled back to the beam of SPPs, it will introduce severe losses.

A device may comprise other conductor-dielectric interfaces in the vicinity of a conductor-dielectric interface holding an SPP. An SPP may couple to SPP modes at other interfaces if the interfaces lie closer together than the extension of the EM field of the SPP. If the conducting material is very thin, such as a metal film, it can itself provide two interfaces supporting SPP modes. An SPP coupled to SPP modes of one interface of a thin layer of conducting material can couple with SPP modes on the other. This combination of modes generates two combined modes propagating on, or tied to, both conductor-dielectric interfaces as shown in FIG. 1B. A symmetric mode 8 having high EM field amplitudes in the conducting layer 2 and tales into the dielectric layers 3 and 5 on both sides, and an asymmetric mode 9 having low EM field amplitudes in the conducting layer 2 and high amplitudes in the dielectric layers 3 and 5. The symmetric mode 8 is similar to the normal SPP mode 6 propagating on one interface in FIG. 1A. However, the asymmetric mode 9 represents what is called a Long-Range Surface Plasmon Polariton (LR-SPP) (See e.g. S. Glasberg, Appl. Phys. Lett. 70, 1210 (1997) and references therein). LR-SPPs are allowed to propagate with less damping due to their small amplitude in the conducting layer 2. In the terminology of the present invention, an SPP may be an SPP propagating on one interface or an LR-SPP propagating on two interfaces of a thin conducting layer.

However, as is shown by experiments performed in accordance with a preferred embodiment of the present invention, notwithstanding the losses from scattering of SPPs, it is still possible to provide a localisation of SPPs using SPPBG structures resulting in guiding over distances of more than a few wavelengths and longer, this is especially true for structures supporting LR-SPPs.

According to a first aspect, the present invention provides a device for guiding surface plasmon polaritons (SPPs) having a first frequency, said waveguide device comprising, a first medium having a first interface to a second medium, said interface being adapted to guide surface plasmon polaritons and being at least substantially plane, and a plurality of scattering centres, each scattering centre being a region whose cross section in a plane at least substantially parallel to the first interface is an area having a complex dielectric constant different from the complex dielectric constants of the surrounding areas in said plane, wherein projections of said scattering centres at least substantially perpendicularly onto the first interface define one or more non-transmitting parts and one or more transmitting parts on the first interface by forming predetermined, at least substantially periodic patterns of projected scattering centres in said non-transmitting parts, thereby making the non-transmitting parts SPPBG (surface plasmon polariton band gap) regions adapted to at least substantially prohibit the propagation of SPPs having the first frequency, and by not forming the predetermined pattern in the one or more transmitting parts, and wherein the plurality of scattering centres are positioned so as to define at least one transmitting part being at least partially surrounded by one or more non-transmitting parts on the first interface.

A surface plasmon polariton is an EM wave propagating as a charge density oscillation on an interface between two materials. In order for the EM wave to propagate on the interface, the interface must be between a first material having, at the frequency of the wave, AC conductivity and a second material which are both transparent to EM radiation at the frequency of the wave. These conditions can be expressed in the frequency dependent complex dielectric constant $\in$ of the materials.

The dielectric properties of materials are strongly dependent on the frequency of the applied EM fields. The frequency ranges in which a material has a complex dielectric constant $\in$ with a negative or positive real part Re($\in$) depends on a number of properties such as the character of the free and bound charges in the material. Typically, for each material or material composition at a given temperature, pressure etc., there will be a frequency above which the complex dielectric constant of the material has a positive real part, Re($\in$)>0, and below which the complex dielectric constant of the material has a negative real part, Re($\in$)<0. Thus, the first and second frequency ranges are typically bound only in one end.

Hence, preferably the interface is between the first medium having a first complex dielectric constant $\in_1$ with a negative real part, $\text{Re}(\in_1)<0$, in a first frequency range, and a second medium having a second complex dielectric constant $\in_2$ with a positive real part, $\text{Re}(\in_2)>0$, in a second frequency range. Both the first and second frequency ranges comprise the first frequency. The two materials forming the first interface is thus preferably a conducting material and a dielectric material, the conducting material being the first medium and the dielectric material being the second medium.

The non-transmitting parts are parts in which propagating SPPs having the first frequency will experience an SPPBG at least substantially prohibiting the propagation of the SPP. The frequency range within which the SPPBG will prohibit propagation of SPPs depends on the spatial period of the at least substantially periodic pattern of projected scattering centres. The transmitting parts are parts in which SPPs having the first frequency can propagate freely. However, the transmitting parts does not necessarily support the propagation of SPPs of any frequency, since the transmitting parts may establish an SPPBG having a band gap not comprising frequencies different from the first frequency.

Thus, the transmitting parts either has a different pattern of projected scattering centres than the non-transmitting parts or is at least substantially void of periodic patterns of projected scattering centres. The transmitting parts may therefore also comprise an at least substantially periodic pattern of projected scattering centres having a spatial period different from the predetermined pattern. Hence, the transmitting parts of the first interface may comprise a pattern of projected scattering centres similar to the predetermined pattern but having deviations such as resulting from one or more abnormal, missing or displaced scattering centres so as for the transmitting parts of the first interface not to establish an SPPBG.

SPPs having a frequency within the predetermined frequency range can not propagate on the non-transmitting parts of the first interface, whereas they may propagate on the transmitting parts. Hence, SPPs having a frequency within the predetermined frequency range and propagating on a transmitting part will be at least partly reflected when incident on an interface between a transmitting and a non-transmitting part.

In order to provide an SPPBG effect, the scattering centres should form a periodic pattern as seen from a propagating SPP, thus, the pattern have an extension at least substantially parallel to the first interface of the first medium on which the SPPs propagates. This is not to be interpreted as meaning that all scattering centres must lie in substantially the same plane. Actually, scattering centres may lie at different distances from the first interface, thereby contributing differently to the all-over SPPBG effect. However, in order for a scattering centre to cause scattering of an SPP propagating on the first interface, the SPP shall have non-vanishing field amplitude at the position of the scattering centre. The penetration depth of the field amplitude of an SPP having a frequency in the visible range into air is typically less than 1000 nanometers (1 nanometer=$10^{-9}$ m=1 nm).

The majority of the scattering centres are preferably positioned within an at least substantially planar region having an extension at least substantially parallel to the first interface. Preferably, the at least substantially planar region is located within a distance of less than 1000 nm from the first interface. Optionally, the at least substantially planar region is located within a distance of less than 500 nm from the first interface, such as less than 100 nm or less than 50 or 10 nm.

The at least substantially planar region comprising at least a majority of the scattering centres, such as all the scattering centres may be positioned in different media depending of the specific material structure of the device. In a preferred embodiment, at least part of the at least substantially planar region is comprised by the first medium. In another preferred embodiment at least part of the at least substantially planar region is comprised by the second medium.

The second medium preferably comprises one or more materials selected from the group consisting of: $SiO_2$, air, polymers, $Al_2O_3$ (sapphire), quarts, and limeglass. Also, the first medium may preferably comprise one or more materials selected from the group consisting of: Au, Cu, Ag, Al, Cr, Ti, Pt, Ni, Ge, Si, Pd, and superconductors. In a preferred embodiment, the first medium comprises a conducting thin film supported by the second medium.

Alternatively, at least part of the at least substantially planar region is comprised by a third medium adjacent to the second medium. Since the material structure of the device typically comprise various layers of deposited material, the device may further comprise one or more material layers between the second and the third medium.

In order to support LR-SPPs, the first medium is preferably a thin conducting film supported by the second medium, so that coupling between SPP modes on either side of the film is made possible. Preferably, the film has a thickness smaller than 100 nm. However, the thinner the film, the smaller the damping of the LR-SPPs in the film is. Hence, preferably the film has a thickness smaller than 50 nm, such as smaller than 25 nm, 10 nm, 5 nm, 2 nm, 1 nm, 0.5 nm, 0.25 nm, or 0.1 nm. Also, to optimise the propagation of LR-SPPs, the dielectric materials sandwiching the thin conducting film preferably has similar dielectric properties, such as identical dielectric properties.

In a preferred embodiment, the second medium comprises a gain medium for coupling energy to SPP modes supported by the first interface. The gain medium may be e.g. electrically or optically pumped.

The non-transmitting parts can be used to control the propagation of an SPP by restricting the areas on the first interface on which the SPP can propagate. In the present application, the term guiding designates any control of the propagation of an SPP by use of non-transmitting or parts or equivalent. Hence an SPP waveguide is a device for guiding SPPs by controlling the propagation of an SPP from one point on the first interface to another. An SPP waveguide is thus a transmitting part which is partly surrounded by non-transmitting parts so as to form a channel or a guide through the non-transmitting parts. Alternatively, a device for guiding SPPs may be a mirror or a grating for deflecting incident SPPs or a filter for deflecting transmitting SPPs depending on their frequency.

A transmitting part surrounded by non-transmitting parts so as to localise an EM field by supporting standing SPP-waves may form an SPP cavity. The period of the predetermined pattern of some of the non-transmitting parts surrounding a cavity may be de-tuned so as to have a small transmittivity thereby providing an output coupler from the cavity.

The device preferably further comprises one or more input coupling structures for coupling photons to SPPs in a controlled manner and or one or more output coupling structures for coupling SPPs to photons in a controlled manner.

Now, having provided a device which can guide SPP using transmitting and non-transmitting parts, it is possible to form components and circuits for processing SPPs.

Hence, in a second aspect, the present invention provides an SPP component comprising an SPP receiving part comprising an input coupling structure for receiving one or more SPPs and an SPP waveguide according to the first aspect of the present invention for deflecting at least part of one of the one or more received SPPs.

The SPP component preferably further comprises at least one active region having a controllable complex refractive index for inducing phase and/or amplitude modulations in guided SPPs, the SPP component further comprising means for controlling the complex refractive index of the active region. The active region preferably lies in the dielectric material within the extent of the EM of the SPPs. Also, the SPP waveguides of the SPP component may form an interferometer comprising the at least one active region.

In another embodiment, the SPP component preferably further comprises a further non-transmitting part being an SPPBG region adapted to at least substantially prohibit the propagation of SPPs having a frequency different from the first frequency, in order to form a wavelength filter for SPPs.

Similarly, in a third aspect, the present invention provides an SPP circuit comprising:
  an input structure for coupling photons to SPPs,
  at least one output structure for coupling SPPs to photons,
  one or more SPP components according to claims 20–23, and
  two or more SPPBG waveguides according to claim 2 for guiding SPPs from the input structure to one of the one or more SPP components, and for guiding SPPs from one of the one or more SPP components to the at least one output structure.

According to a fourth aspect, the present invention provides a method for controlling the propagation of surface plasmon polaritons (SPPs) propagating on an at least substantially planar interface between a first and a second medium, said method comprising the steps
  providing the first medium, the first medium comprising a first material layer having a first complex dielectric constant $\in_1$ with a negative real part, $\mathrm{Re}(\in_1)<0$, in a first frequency range and having a first surface abutting the interface,
  providing the second medium, the second medium having, in at least some parts abutting the interface, a second complex dielectric constant $\in_2$ with a positive real part, $\mathrm{Re}(\in_2)>0$, in a second frequency range at least in one or more parts abutting the interface,
  propagating an SPP at the interface, said SPP having a first frequency comprised in the first and second frequency range,
  defining a propagation layer comprising the interface and surrounding regions, wherein every point is subject to an electromagnetic field of the SPP having a strength not less than 1% of an electromagnetic field at the interface when the SPP propagates on the part of the interface closest to the point, and
  confining the SPP to a transmitting part of the interface by providing one or more non-transmitting parts of the interface being SPPBG (surface plasmon polariton band gap) regions at least substantially inaccessible to SPPs having a frequency within a third frequency range comprising the first frequency, said SPPBG regions being defined by a plurality of scattering centres in the propagation layer forming a predetermined, at least substantially periodic pattern when projected at least substantially perpendicularly onto the first interface, each scattering centre being a region whose cross section, in a plane at least substantially parallel to the interface, is an area having one or more complex dielectric constants different from the complex dielectric constant of the surrounding areas in said plane.

SPPs having a frequency within the third frequency range can only propagate on the transmitting part. The frequency of an electromagnetic wave is typically a frequency range characterised by a frequency distribution having a given width and a centre frequency, the frequency of the wave typically refers to the centre frequency.

The SPPBG structure needed to guide the plasmon waves can be obtained by forming a 2D lattice of scattering centres. Scattering centres are typically periodic variations in the complex dielectric constant of the SPP carrying media or local geometric deformations in the interface. Since an SPP is an electromagnetic wave, scattering centres need not to be formed in, or in contact to, the interface. Periodic variations in the complex dielectric constant will provide scattering centres to an SPP if the field amplitudes is non-vanishing at the position of the variation, and hence may well lie anywhere within the electromagnetic field of the SPP.

An SPP wave is confined to move on the interface, but its field is not confined to the interface as can be seen in FIG. 1. Thus, the electromagnetic field amplitudes of an SPP extent into the neighbouring media in the directions perpendicular to the interface. The extent depends on the SPP mode and on the dielectric properties of the materials in a given direction. This means that there is a region surrounding an interface on which an SPP propagates wherein the electromagnetic field of the SPP is non-vanishing. Given that the interface is preferably planar, this region of non-vanishing fields will establish a propagation layer of varying thickness.

Any variation of the complex dielectric constant at a point with non-vanishing SPP field amplitude will give rise to some scattering. Hence, in order for a scattering centre to be seen by a propagating SPP, the scattering centre preferably resides in the propagation layer as a local variation in the complex dielectric constant in a plane at least substantially parallel to the first interface on which the SPP propagate. Using a plane to define a scattering centre allows for each centre, and its corresponding intersecting plane, to be positioned at any vertical position in the propagation layer. The plane corresponding to a scattering centre is specific to the individual scattering centre and hence not the same plane as used to describe the extension of the pattern.

As seen from a position outside the propagation layer, the predetermined pattern may be projected perpendicular onto the interface and thereby form the non-transmitting parts in which SPPs experience the predetermined pattern and the transmitting parts in which they do not. For an SPP propagating on the interface and having a frequency within the SPPBG of the predetermined pattern, the non-transmitting parts of the second interface are forbidden regions wherefore the SPP will be confined to the transmitting parts experiencing an at least substantially total reflection when propagating towards the non-transmitting parts.

However, the strength of the SPPBG effect from a pattern of scattering centres will depend of the SPP field amplitudes at the position of the scattering centre. Scattering centres experiencing high field amplitudes will give rise to strong SPPBG effects whereas scattering centres experiencing low field amplitudes will give rise to weak SPPBG effects. The strength of the SPPBG effect from a pattern of scattering centres may also depend on the contrast of the complex dielectric constant of the scattering centre to the complex dielectric constant of the surrounding media.

In order to obtain a significant contribution from a scattering centre, the scattering centres are preferably comprised within a propagation layer defined as regions wherein the field strength from an SPP are larger than 0.1% of the field strength at the interface, such as larger than 0.5% or larger than 1% or 2% of the field strength at the interface, even, to obtain stronger SPPBG effects, larger than 5% or 10% such as larger than 25% or 50% of the field strength at the interface. Optionally, the scattering centres are positioned in contact with the interface or formed as geometrical deformation of the interface.

In a preferred method according to the second aspect of the present invention, the scattering centres are structures formed at the interface in the first and/or second media.

The step of propagating the SPP preferably further comprises the step of propagating the SPP on the transmitting part of the interface. Also, the step of confining the SPP to the transmitting part of the interface preferably further comprises the step of, whenever the SPP propagates from the transmitting part of the interface into the non-transmitting part of the interface, reflecting at least part of the SPP on the non-transmitting part of the interface and propagating the reflected part of the SPP on the transmitting part of the interface.

The first and non-transmitting parts of the interface may thereby define an SPPBG waveguide or cavity, depending on the topology of the transmitting and non-transmitting parts. An SPPBG waveguide is typically formed by one or more connected transmitting parts leading from one position to another and used to transport and/or process a light signal propagating between the position. Hence, an SPPBG waveguide is typically formed by transmitting parts which are connected to photon/SPP-couplers or SPP-components. An SPPBG cavity is typically an isolated transmitting part being closed in the sense that it supports standing SPP waves. An SPPBG cavity may be formed by a single deviation such as an omitted or abnormal scattering centre. An extremely high intensity can be obtained from localised field of standing SPP-waves by continuously coupling photons to a cavity, e.g. for use in sensor applications.

In order for the transmitting part of the interface to support propagation of SPPs, the corresponding parts of the propagation layer may comprise scattering centres as long as these do not provide an SPPBG. Hence, parts of the propagation layer comprising the transmitting part of the interface may comprise a pattern of scattering centres different from the predetermined pattern or be at least substantially void of scattering centres.

The method may be applied in relation to the optical signals, thus, the method may further comprise the step of forming the SPP by coupling one or more photons to the interface.

Similarly, the method may further comprise the step of coupling at least part of the SPP to one or more photons.

In order to utilise the method in relation to signal processing wherein a plurality of electromagnetic waves are controlled. Hence, the method may further comprise the step of propagating a SPP on the interface, said second SPP having a second frequency.

The second SPP may be provided at a different time than the first SPP (time division) and/or the second frequency may be different from the first frequency (wavelength division).

If the second frequency is different from the first frequency and outside the third frequency interval, the step of confining the SPP to the transmitting part of the interface may further comprise the step of propagating the second SPP on one of the non-transmitting parts of the interface. Thereby the first and second SPP can add and/or separate on the interface. This step may be used as a wavelength filter for use in e.g. wavelength division multiplexing (WDM) of signals.

Also, the band gap of the SPPBG may be adjusted in order to control the propagation of the second SPP. Hence, the method may further comprise the steps of
    changing the third frequency range so as to comprise the second frequency, and
    reflecting at least part of the second SPP on the non-transmitting part of the interface whenever the second SPP propagates from the transmitting part of the interface into the non-transmitting part of the interface, and propagating the reflected part of the second SPP on the transmitting part of the interface.

In a preferred embodiment, the SPPBG is modulated so as to modulate the second SPP. The propagation region may comprise electro-optic materials whereby the complex dielectric constant of the materials forming the predetermined pattern, and thereby also the band gap, may be adjusted electrically for use in e.g. time divisional multiplexing.

In another preferred embodiment, the SPPBG may be amplified or modulated by further providing the steps of:
    providing a gain medium in the second medium for coupling energy to SPP modes supported by the first interface, said gain medium defining a transmitting part of the first interface when projected perpendicularly onto the first interface,
    pumping the gain medium electrically or optically, and
    amplifying the guided SPP by coupling energy from the gain medium to the mode containing the SPP.

In a fifth aspect, the present invention provides a first method for manufacturing a device for controlling the propagation of an SPP (surface plasmon polariton) having a first frequency and propagating on an at least substantially planar interface, said method comprising the steps of:
    providing a substrate having an at least substantially planar surface, forming, in one or more parts of the substrate surface, a predetermined and at least substantially periodic pattern of structures which are concave or convex with respect to the substrate surface so as to define one or more non-transmitting parts of an interface between the substrate and a first material layer held by the substrate surface so as to form concave or convex structures in the first layer which are associated with the concave or convex structures of the substrate surface, the first material layer having a complex dielectric constant of with a negative real part, $Re(\epsilon_1)$ <0, in a first frequency range comprising the first frequency, the interface being an upper or a lower surface of the first material layer,
    wherein the pattern of structures is formed so as to define one or more transmitting parts on the interface without said predetermined pattern, said transmitting parts being at least partly surrounded by one or more non-transmitting parts of the substrate surface.

Preferably, the interface is adapted to support the propagation of SPPs and the one or more non-transmitting parts of the interface provides one or more SPPBG (surface plasmon polariton band gap) regions on the interface.

In order to form SPP waveguides or cavities, the transmitting parts establish regions of the interface in which the at least partly surrounding non-transmitting parts confine the SPPs. In a preferred embodiment, the first method for manufacturing comprises the step of forming the pattern of structures so as to define one or more channels of transmitting parts in the non-transmitting parts for establishing an SPP waveguide in the non-transmitting parts on the interface. In another preferred embodiment, the first method for manufacturing comprises the step of forming the pattern of structures so as to define a transmitting part being surrounded by non-transmitting parts on the interface in order to establish an SPP cavity.

In a sixth aspect, the present invention provides a second method for manufacturing a device for controlling the propagation of an SPP (surface plasmon polariton) having a first frequency and propagating on an at least substantially planar interface, said method comprising the steps of:

providing a first material layer having a complex dielectric constant $\in_1$ with a negative real part, $Re(\in_1)<0$, in a first frequency range comprising the first frequency, the interface being defined as the plane associated with an upper or a lower surface of the first material layer, and removing selected regions of, or altering the complex dielectric constant of selected regions of, the first layer so as to form a predetermined, at least substantially periodic pattern of selected regions in the first layer, the selected regions having a complex dielectric constant different from $\in_1$, wherein the selected regions define one or more non-transmitting parts and one or more transmitting parts of an interface between the first layer and a second medium, and wherein said transmitting parts being at least partly surrounded by the one or more non-transmitting parts of the first layer.

Preferably, the interface is adapted to support the propagation of SPPs and the one or more non-transmitting parts of the interface provides one or more SPPBG (surface plasmon polariton band gap) regions on the interface.

In order to form SPP waveguides or cavities, the transmitting parts establish regions of the interface in which the at least partly surrounding non-transmitting parts confine the SPPs. In a preferred embodiment, the first method for manufacturing comprises the step of forming the pattern of regions so as to define one or more channels of transmitting parts in the non-transmitting parts for establishing an SPP waveguide in the non-transmitting parts on the interface. In another preferred embodiment, the first method for manufacturing comprises the step of forming the pattern of regions so as to define a transmitting part being surrounded by non-transmitting parts on the interface in order to establish an SPP cavity.

In a seventh aspect, the present invention provides a third method for manufacturing a device for controlling the propagation of an SPP (surface plasmon polariton) having a first frequency and propagating on an at least substantially planar interface between a material layer and a medium, said method comprising the steps of:

providing the substrate having a surface abutting the material layer, the substrate having a complex dielectric constant $\in_2$ with a positive real part, $Re(\in_2)>0$, in a second frequency range comprising the first frequency, and altering the complex dielectric constant of a plurality of regions in the substrate to a complex dielectric constant different from $\in_2$, said plurality of regions being positioned so as to, when projected at least substantially perpendicularly onto the interface, form one or more predetermined, at least substantially periodic patterns defining one or more non-transmitting parts of the interface.

providing the material layer on the surface of the substrate, said material layer having a first complex dielectric constant $\in_1$ with a negative real part, $Re(\in_1)<0$, in a first frequency range comprising the first frequency and having an upper and a lower surface, the interface being defined as the plane associated with the upper or the lower surface of the material layer, wherein the one or more predetermined patterns define one or more transmitting parts of the interface without the predetermined pattern, said transmitting parts being at least partly surrounded by the one or more non-transmitting parts.

Preferably, the interface is adapted to support the propagation of SPPs and the one or more non-transmitting parts of the interface provides one or more SPPBG (surface plasmon polariton band gap) regions on the interface.

Preferably, the medium forming the interface with the material layer is the substrate. The substrate may however comprise one or more layers of different material composition.

In order to form SPP waveguides or cavities, the transmitting parts establish regions of the interface in which the at least partly surrounding non-transmitting parts confine the SPPs. In a preferred embodiment, the first method for manufacturing comprises the step of positioning the plurality of regions so as to define one or more channels of transmitting parts in the non-transmitting parts for establishing an SPP waveguide in the non-transmitting parts on the interface. In another preferred embodiment, the first method for manufacturing comprises the step of positioning the plurality of regions so as to define a transmitting part being surrounded by non-transmitting parts on the interface in order to establish an SPP cavity.

It is a common feature for all the predetermined patterns forming SPPBG regions according to the present invention, that it is the spatial period and the structure (meaning the 2-dimensional lattice structure as defined by a unity cell) of the predetermined pattern which determines the predetermined frequency range of the band gap. The frequencies comprised in the predetermined frequency range of an SPPBG are the frequencies of the guided SPPs in the material configuration of the device. Given a specific device, it is often possible to find a relationship between the spatial period $\Lambda$ and the wavelengths $\lambda_{SPP}$ of SPPs having a frequency in the predetermined frequency range. Preferably the spatial period of the predetermined pattern is within the intervals 2.5 nm –25 μm such as 2.5–250 nm or 250 nm–25 μm, preferably within the intervals 25–250 nm or 250–700 nm. Also, the predetermined frequency range preferably comprises SPP frequencies corresponding to $\lambda_{SPP}$ within the intervals 10 nm–100 μm such as 10–1000 nm or 1–100 μm, preferably within the intervals 100–1000 nm or 1000–3000 nm.

Often, it will be of interest that the predetermined frequency range comprises the frequencies of SPPs resulting from the coupling of photons having a wavelength $\lambda_{photon}$ in a predetermined wavelength range. The relationship between $\lambda_{SPP}$ and $\lambda_{photon}$ depends on the material configuration of the device. Given a specific device, it is often possible to find a relationship between the wavelength $\lambda_{photon}$ of a photon and $\lambda_{SPP}$ of the resulting SPP when the photon is coupled to the device. Hence, the predetermined frequency range preferably comprises SPP frequencies corresponding to the wavelengths $\lambda_{photon}$ of photons coupled to the device, said photons having a wavelength within the interval 100–20.000 nm.

Optionally, the predetermined frequency range comprises SPP frequencies corresponding to wavelengths $\lambda_{photon}$ within the interval 100–380 nm so as for the predetermined pattern to interact with SPPs resulting from the coupling of ultraviolet photons. Alternatively, the predetermined frequency range comprises SPP frequencies corresponding to wavelengths $\lambda_{photon}$ within the interval 380–780 nm so as for the predetermined pattern to interact with SPPs resulting from the coupling of visible photons. Preferably, the predetermined frequency range comprises SPP frequencies corresponding to wavelengths $\lambda_{photon}$ within the interval 780–20.000 nm so as for the predetermined pattern to interact with SPPs resulting from the coupling of infrared photons. Preferably, the predetermined frequency range comprises SPP frequencies corresponding to wavelengths $\lambda_{photon}$ within the interval 780–3.000 nm such as within the interval 1.100–2.000 nm in order for the resulting device to be used in the optical communication industry.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A detailed description of the present invention will be given in the following, and some typical embodiments will be described in relation to the drawings, which are given by way of illustration only, and thus are not limitative of the present invention, and where:

FIG. 3A shows the electron beam written pattern in a resist prior to RIE etch.

DETAILED DESCRIPTION OF THE INVENTION

Figure 1A:
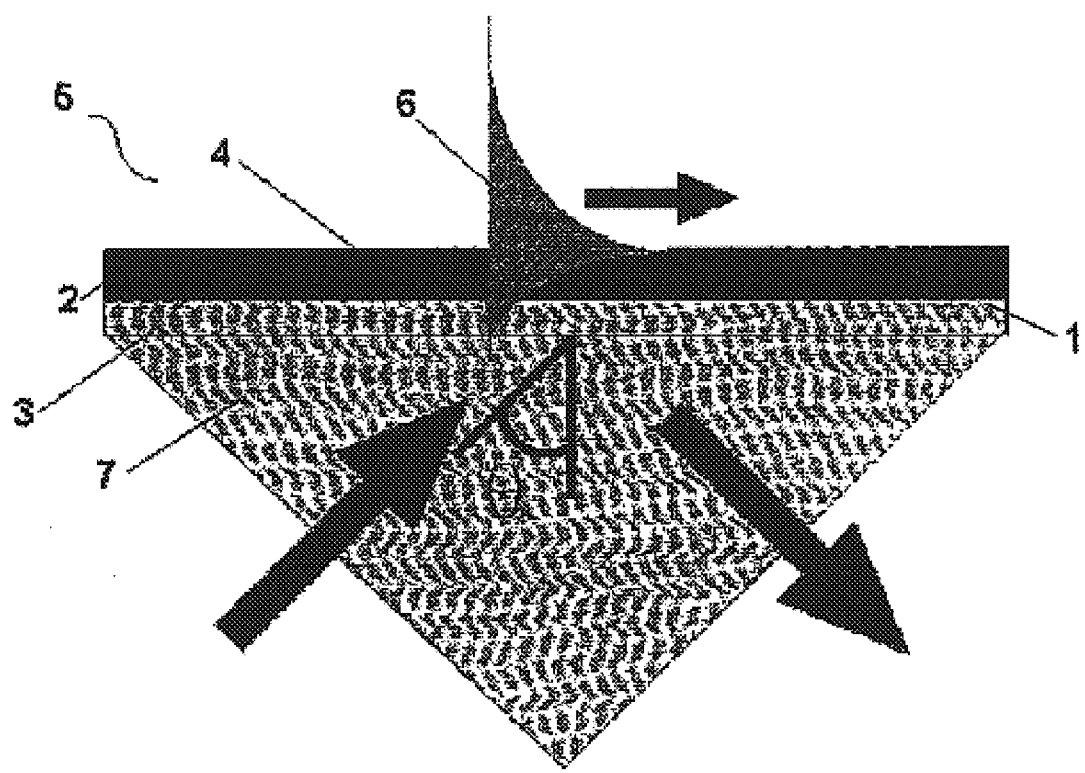
FIG. 1 is a cross sectional view of an SPP coupled to and propagating on a metal-glass interface according to the prior art.
Figure 1B:
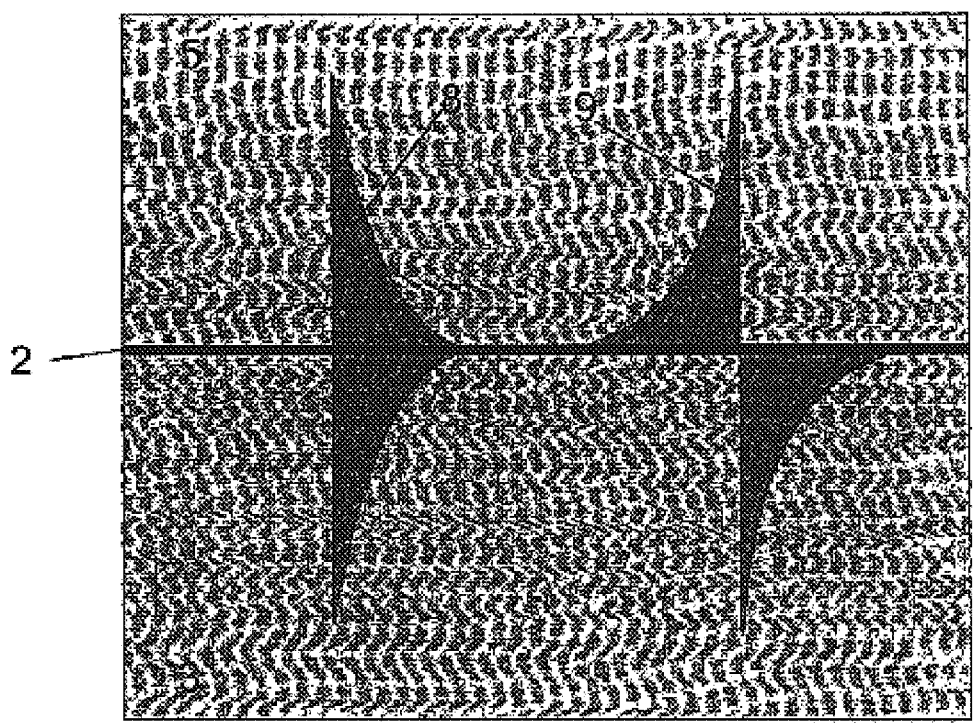

SPPs can be described as electromagnetic waves propagating along a metal-dielectric interface and having the amplitudes exponentially decaying in the neighbouring media as shown in e.g. FIG. 1. The SPP propagation constant β can be obtained from matching the electromagnetic field across the interface and is determined by the corresponding dielectric constants $\in_1$ and $\in_2$ of the two media: $\beta=(2\pi/\lambda)[\in_1\in_2/(\in_1+\in_2)]^{1/2}$, where λ is the wavelength of light in free space. The propagation length of SPPs is thereby limited due to the internal damping (ohmic losses): $L_{SPP}=(2 \operatorname{Im}\beta)^{-1}$, where $L_{SPP}$ is the distance after which the SPP intensity decreases to 1/e of its starting value.

In its simplest form, the present invention is an SPP waveguide formed in an SPPBG structure by forming regions in SPPBG structures having a periodic modulation being different from the periodic modulation of surrounding areas or being free from periodic modulation. Thereby, SPPs having an energy/frequency in the energy/frequency band gap of the SPPBG structure will be confined to these regions. The SPPBG are periodically positioned scattering centres in the SPP carrying medium and/or interface. The scattering centres are typically local variations in the complex dielectric constant or local geometric deformations of the SPP carrying medium and/or interface.

Figure 3A:
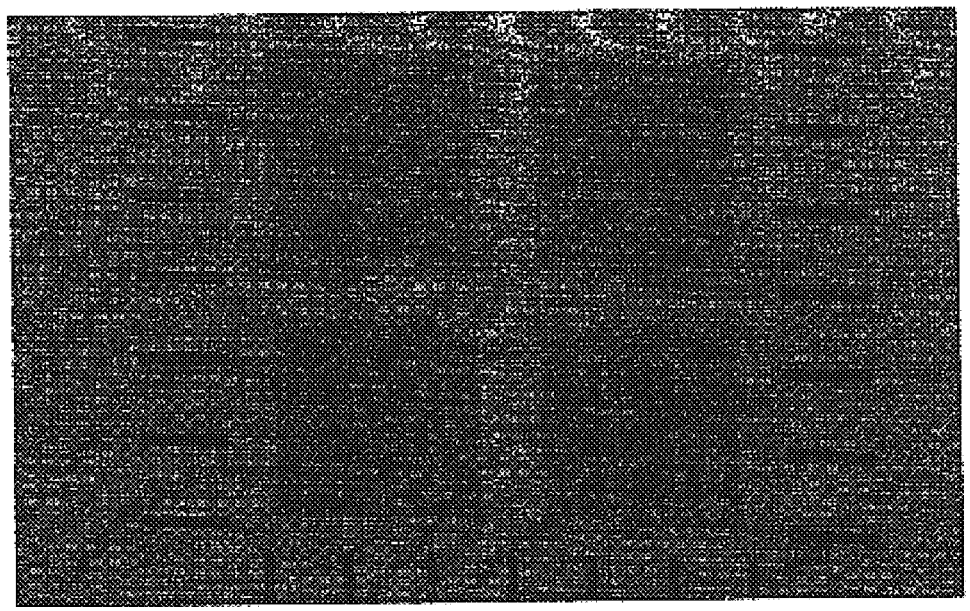
FIGS. 3A and B are photographs showing an embodiment of an SPPBG waveguide device according to the present invention during different stages of the production.

A simple embodiment of the present invention is straight or bend waveguides as shown in FIGS. 3A and B. The waveguides can be used for ultra compact signal guiding and for interconnecting various component or optical circuits on optical chips. Another simple embodiment is cavities formed by few or single deviations, such as abnormal or absent scattering centres. Such cavities can support standing SPP-waves giving rise to highly localised high intensity fields which can be used for sensor applications.

The losses due to radiation leaking from the SPPBG waveguide of FIG. 3A or B will typically be negligible compared to the various types of damping that limits the propagation of SPPs in general. The propagation constant $\beta$ of SPP can be obtained from matching the electromagnetic field across the interface and determined by the corresponding complex dielectric constants $\in_1$ and $\in_2$ of neighbouring media: $\beta=(2\pi/\lambda)[\in_1\in_2/(\in_1+\in_2)]^{1/2}$, where $\lambda$ is the wavelength of the SPP-coupled light in free space. The propagation length L of SPPs is the distance after which the SPP intensity is decreased to 1/e of its starting value. The propagation length L of SPPs thereby limited due to the internal damping (ohmic losses): $L=(2Im\beta)^{-1}$. In silver, for example, the SPP propagation length reaches ~25 $\mu$m at the light wavelength of 0.6 $\mu$m and ~500 $\mu$m at 10 $\mu$m. The SPP propagation length may get further reduced due to the radiation damping out of the interface plane and inelastic SPP scattering.

One can significantly reduce the SPP radiation losses, i.e., losses by radiation of SPPs out of the interface plane, within a wide wavelength range by using periodic structures with smooth profiles.

The SPP electromagnetic field exponential decay into air is typically less than 1 $\mu$m in the visible wavelength range. This means that the SPP field is tightly bound to the metal-dielectric interface.

The SPPBG structure needed to guide the plasmon waves can be fabricated in several ways. An SPPBG structure can be obtained by forming a 2 dimensional lattice of scattering centres. The scattering centres are typically local variations in the complex dielectric constant or local geometric deformations of the SPP carrying medium and/or interface.

Figure 2A:
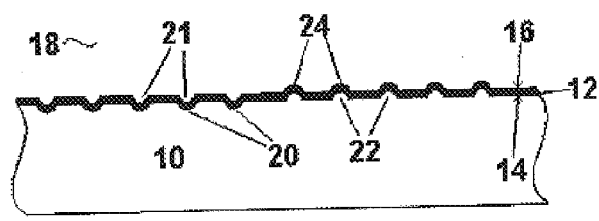
FIGS. 2A–F shows cross sectional views of different types and positions of scattering centres of the periodic pattern in a device according to the present invention.
Figure 2B:
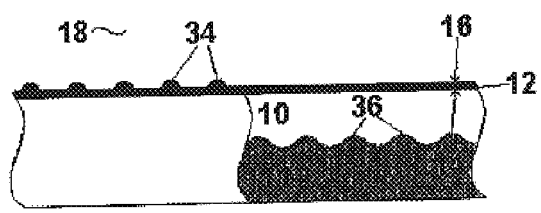

Local geometric deformations of the SPP carrying medium and/or interface can be in the form of small dents or bulges with distances appropriate for a predetermined wavelength and with a predetermined filling factor (ratio of dents/bulges distance to dents/bulges diameter). As shown in FIG. 2A, the deformations are typically formed by forming small holes 20 or protrusions 22 in a glass substrate 10 which is subsequently covered with metal film 12 typically of thickness of less than 50 nm. Such a configuration will result in small protrusions 21 or 24 in the metal film 12 thereby deforming the interfaces 14 and/or 16. Alternatively, as shown in FIG. 2B, starting from a substrate 10 with a metal film 12 and performing electron beam lithography on a resist of the metal film will leave small metal bulges 34 on the film 12 after lift-off. Bulges 21 and 24 form scattering centres for SPPs propagating on either of interfaces 14 or 16. Depending on the thickness of layer 12, the electromagnetic field amplitude of an SPP propagating on the interface 14 extends to the interface 16, and therefore bulges 34 can also establish an SPPBG for SPPs propagating on interface 14. Bulges 21, 24 or 34 on the metal film 12 should not have heights higher than the extension of the electromagnetic field from the metal film (typically approximately 300 nm in air), otherwise the will cause a coupling from SPPs to photons with resulting losses. It is important to note, as will also easily be realised by a person skilled in the art, that one or more material layers may be deposited between the substrate 10 and the metal layer 12 and still obtaining the same SPPBG effect. Generally, the space 18 above the metal layer 12 may be air or any other medium such as an extra metal layer, glass, Silicon, air etc.

Figure 2C:
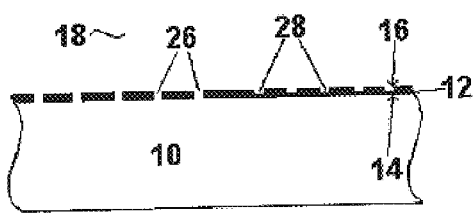

Also, local geometric deformations of an interface can be in the form of holes or modified regions. In FIG. 2C, a 2D pattern of scattering centres is written in a metal coated glass substrate, e.g. by using electron beam lithography or laser ablation. The pattern can be written as holes 26 or indentations 28 in the metal layer 12. The indentations 28 abut the interface 16 and can therefore clearly establish an SPPBG for SPPs propagating on interface 16. Again, depending on the thickness of layer 12, the electromagnetic field amplitude of an SPP propagating on the interface 14 extends to the interface 16, and therefore scattering centres 28 can also establish an SPPBG for SPPs propagating on interface 14. Again, one or more material layers may be deposited on the patterned metal layer. Another example of periodic variations is shown in the right section of FIG. 2B. Here, the variations are established by providing periodic variations in an interface between two materials 10 and 11 with different complex dielectric constant. Seen from an SPP travelling from left to right on interface 14 or 16, the peaks 36 of different complex dielectric constant in medium 10 forms periodic scattering centres for the electromagnetic field of the SPP.

Figure 2D:
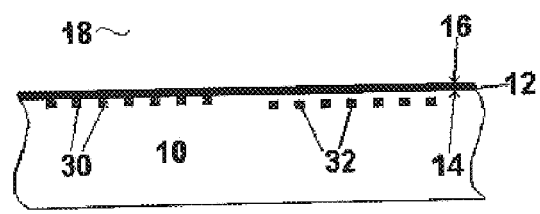

Local variations in the complex dielectric constant of the SPP carrying medium and/or interface can be in the form of complex dielectric constant modulations of a media lying within the range of the electromagnetic field amplitude of an SPP. Thus, scattering centres can be formed in one of the neighbouring media, abutting the interface or not, as illustrated in FIG. 2D. If the substrate 10 is photosensitive, such as a glass substrate, the complex dielectric constant modulations 30 and 32 can be formed by illumination with ultra violet radiation. The complex dielectric constant modulations can also be formed in the metal film 12 by doping the film (not shown). As Illustrated in FIG. 2D, the complex dielectric constant modulations can abut the interface, 30, or be buried regions 32, as long as these lies within the extension of the SPP electromagnetic field which is possible for SPPs propagating on either of interfaces 14 or 16.

The metal film 12, and any periodic modulations formed therein, can be protected e.g. by coating the structure or depositing a protection layer on top of the metal film, hence at least partly filling up the space 18 above the metal film 12 in FIGS. 2A–D. This may cause a slight change in the resonance frequencies etc due to the change in dielectric properties. However, such protection will increase the lifetime of the structure drastically.

Figure 2E:
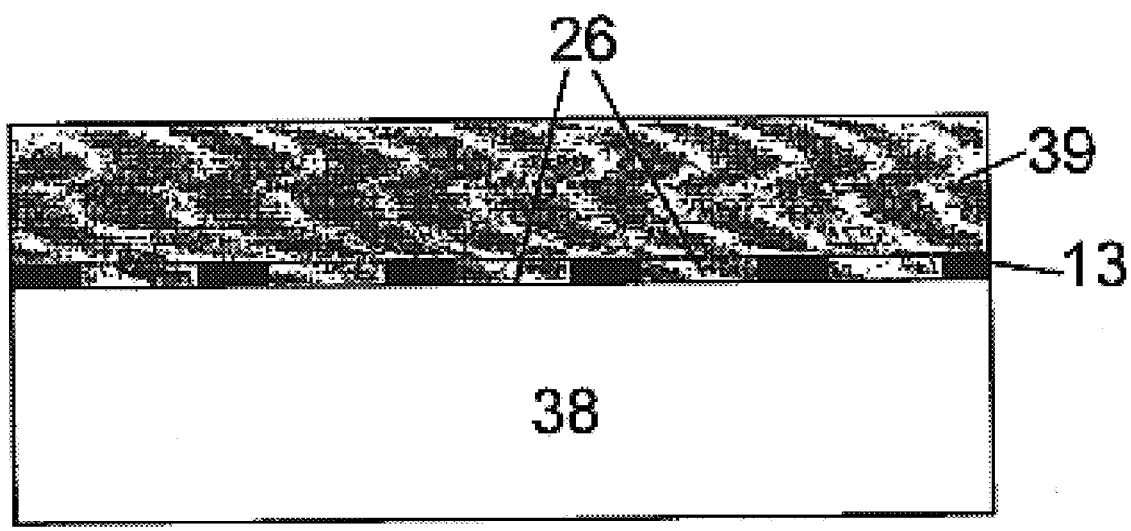
Figure 2F:
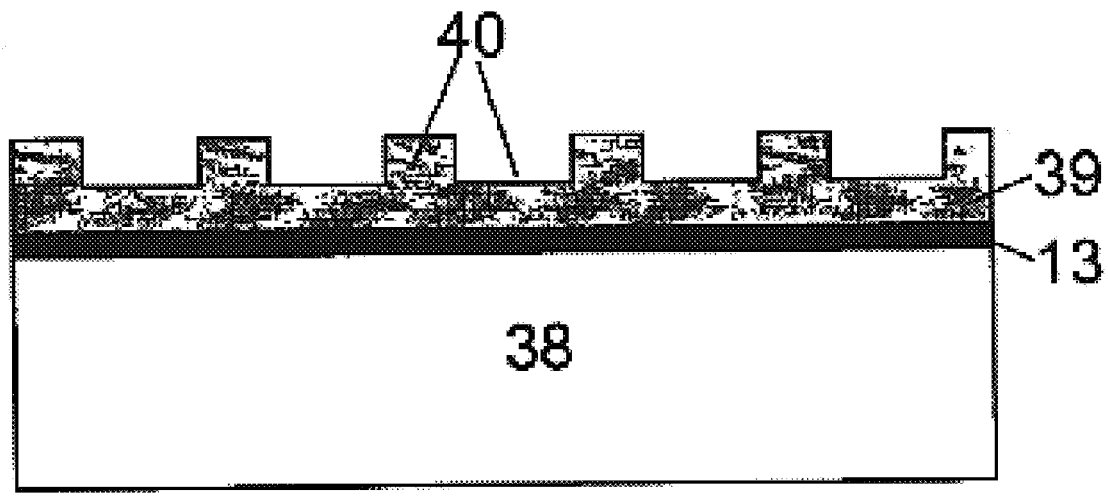

In another class of SPPBG structures, the space 18 above the metal layer is filled with a dielectric different from air. In these structures shown in FIGS. 2E and F, the metal layer is a thin metal film 13 sandwiched between two layers of dielectric materials 38 and 39. In FIG. 2E, the SPPBG structure is formed by punching holes 26 in the metal film 13 using e.g. lithography and etching or lift-off, a pulsed laser, a Scanning Electron Microscope or a similar technique suited for working on a submicrometer scale. In FIG. 2E, the SPPBG structure is formed by modulating the surface of the upper dielectric 39 to an SPPBG structure 40 similar to how grating couplers are fabricated. However, in contrast with grating couplers, the structure 40 forms a 2-dimensional periodic structure which defines waveguides and/or other components.

Other structures and types of scattering centres may be obtained, a scattering centre may be formed by regions consisting of different materials. The current semiconductor/silicon processing technology provides many options and large degrees of freedom when it comes to forming small scale structures, the examples given above is not to be interpreted as restrictive, rather, they provide a broad assembly of typical ways to form scattering centres.

An embodiment of the present invention has been formed according to the method illustrated by scattering centres 21 in FIG. 2A. The embodiment has been obtained with known Silicon processing techniques and consists of patterned glass substrates, prepared using lithography and etching, with metal-coated top surface. The fabrication of the embodiment included 3 fabrication steps:

Electron-beam lithography
Plasma etch
Metal evaporation

In the following, the specific steps used in fabrication of the embodiment will be described in detail. However, it should be understood that each of the individual fabrication steps simply represent an example and could be carried out in other ways.

Electron-Beam Lithography

Starting with a glass substrate, electron-beam lithography is used to pattern the resist in order to fabricate structures of sub-wavelength dimensions. The processing steps are similar to conventional photolithography but instead of illuminating wafers with ultraviolet light through a mask, a converted field-emission scanning electron microscope (SEM) is used to expose an electron-sensitive resist.

Prior to e-beam patterning, a thin metal layer (few nm) is deposited on the glass wafer. This layer provides sufficient surface conductivity to prevent charging of the substrate during e-beam writing and does not interfere with the subsequent plasma etch. A thin layer of resist is spun on a piece of glass after cleaning of the sample. A positive resist, ZEP520 from Nippon Zeon Co. Ltd., has been used, both due to its high sensitivity, allowing for faster writing of structures with more elements, and its high dry etch resistance, which allows a thin layer of resist to be used directly as an etch mask. The resist is developed using ZED N50 developer (n-Amylacetate), after which the sample is cleaned and residual developer removed using ZMD-B rinse (89% MIBK/11% IPA).

Holes were fabricated with diameters down to 50 nm and a regular pitch (spatial period) down to 150 nm over a 40×40 $\mu$m area using 100 nm thick ZEP520 and a modest (10 kV) acceleration voltage to avoid electron backscattering effects (proximity effects). FIG. 3A shows a photograph of the substrate with holes written in the resist. The photo is taken through an optical microscope and the patterned area is 130 $\mu$m square. For the SPPBG structures discussed here, triangular arrays of 150-nm diameter holes with a pitch or spatial period of 400 nm were fabricated in 100 nm resist. The waveguide region is clearly seen as a channel void of holes.

Plasma Etch

Once the small holes in the thin layer of resist are defined, the samples were loaded into the Reactive Ion Etching (RIE) machine. A pump maintains a certain desired pressure while a controlled flow of freon gas ($CHF_2$) is let into the chamber. Two plates on opposite sides of the chamber act as RF antennas to create a plasma. The ionised F atoms are very reactive and reacted with the $SiO_2$ (and to a smaller degree with the resist as well). The etch rate was on the order of 10 nm/min. Typically the holes were 40–80 nm deep.

Figure 3B:
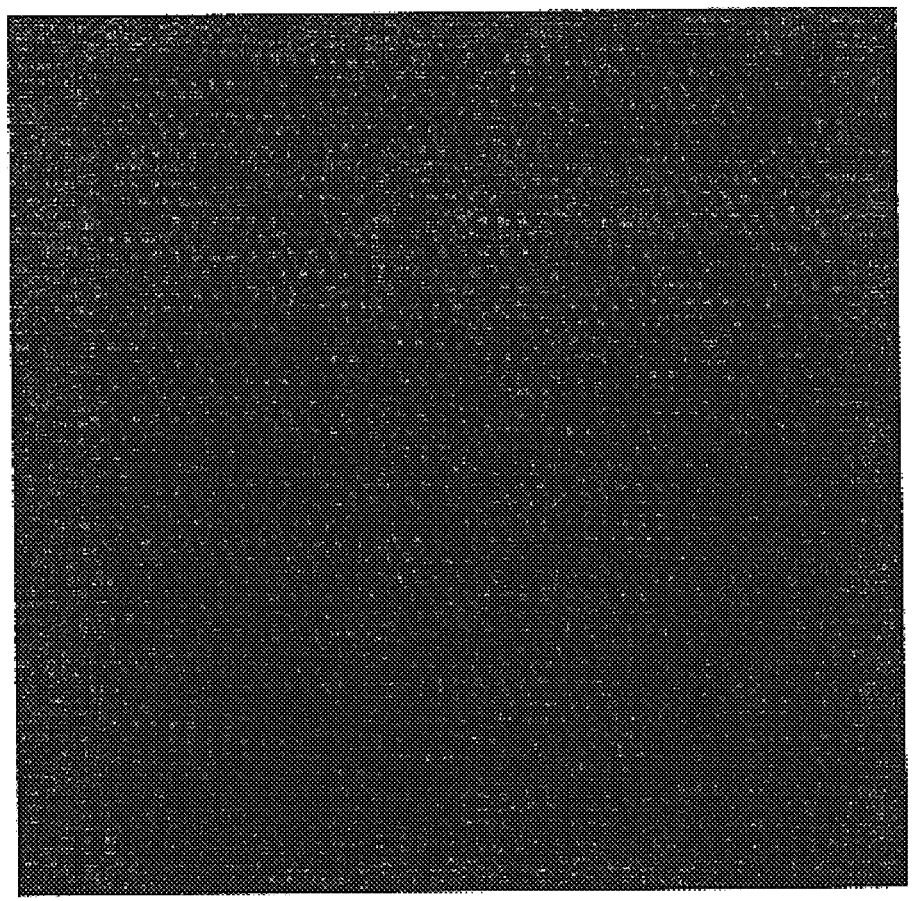
FIG. 3B shows the pattern after RIE etch and resist removal.

After the freon plasma etch, the samples were removed from the chamber and are rinsed in acetone, methanol and water to clean the samples. Any residue were removed with an oxygen plasma etch which attacks only organic material (such as finger grease) and not glass. FIG. 3B shows a photograph of a detail of the clean patterned glass substrate from FIG. 3A after the plasma etch and the resist removal.

Metal Evaporation

It has been found experimentally that a 50 nm thick silver layer is optimal to achieve effective coupling between photons and plasmons. To maintain clean samples with a well defined, homogeneous layer of metal, an E-beam evaporator was used.

Figure 4:
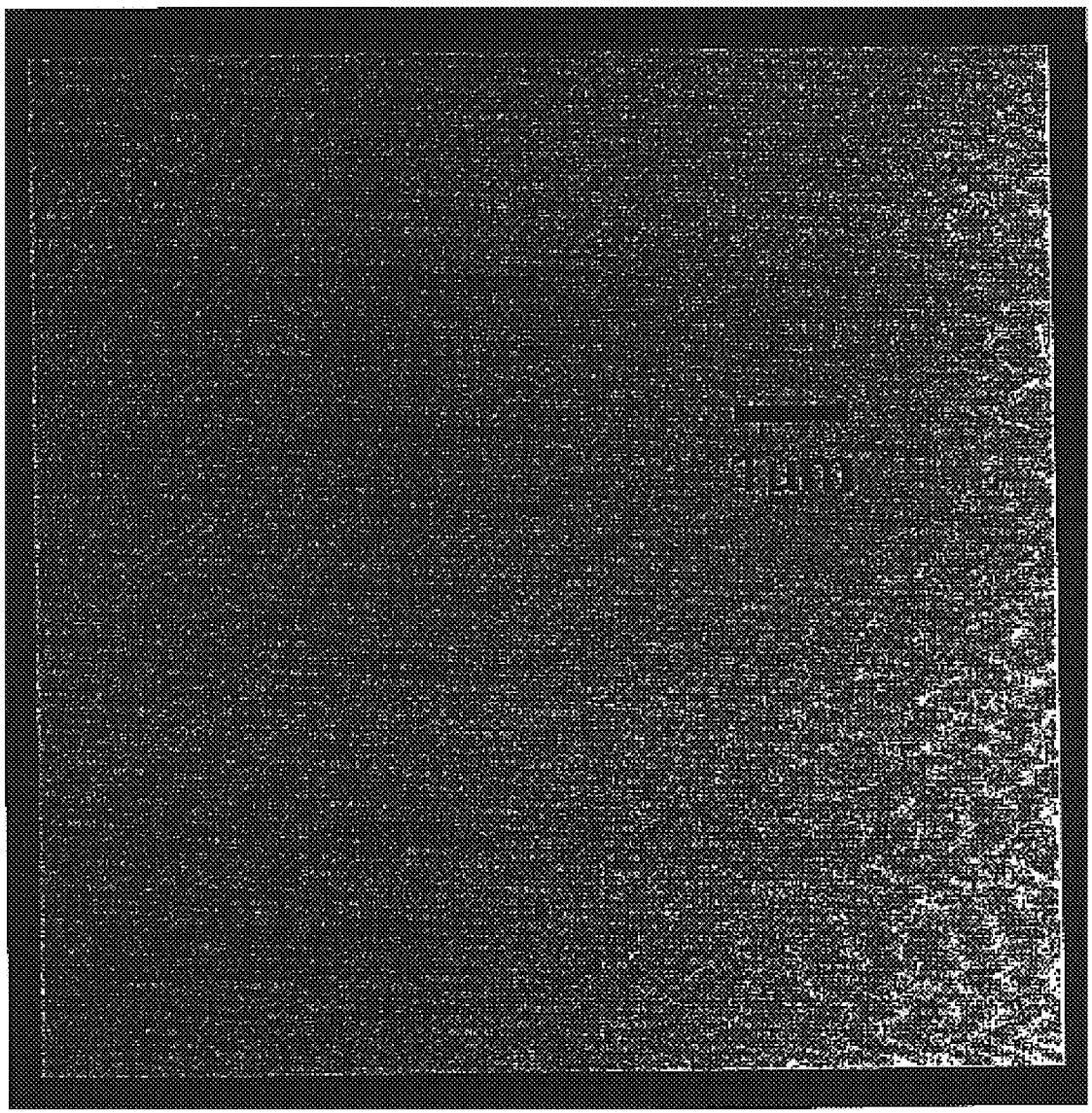
FIG. 4 is a scanning electron microscope (SEM) picture of a glass-air interface with the etched holes of FIG. 3B.

First, a very thin layer (few Å) of Ti was deposited to achieve good adhesion between glass and silver. Subsequently, the silver was evaporated in the desired amount. FIG. 4 shows an SEM picture of a small detail of the sample. In this picture, the holes cover the entire surface and are very shallow (~50 nm).

Figure 5:
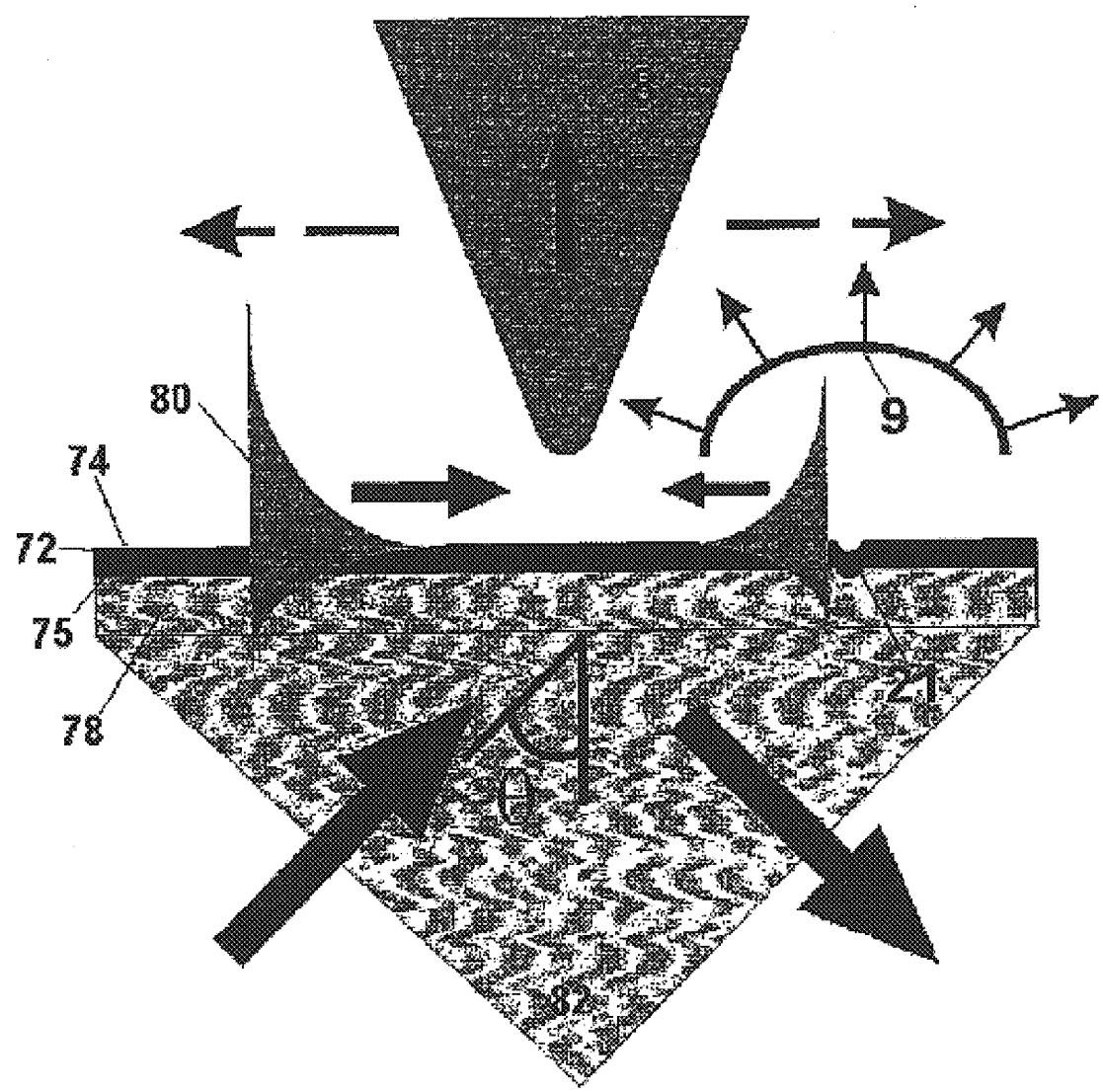
FIG. 5 is a cross sectional view of the near-field imaging of the total electric field intensity distribution created by the resonantly excited SPP and from scattering of SPPs on scattering centres of the SPPBG structure.

In order to investigate the SPPBG waveguiding of the present invention, the intensity distribution of a resonant SPP excitation in the fabricated embodiment was investigated using near-field imaging. FIG. 5 is a schematic representation of the near-field imaging (with an un-coated sharp optical fibre tip 8) of the total electric field intensity distribution created by the resonantly excited SPP 6, which is propagating along the air-metal interface 74 of structured metal film 72 deposited on the surface of a glass substrate 78. The total electric field intensity distribution also contains contributions 9 from scattering of SPPs on scattering centres 21 of the SPPBG structure.

A sharp tip 8 of an optical fibre can be considered as a local detector of the electric field intensity. If the SPP scattering out of the plane (represented by radiation 9 scattering off scattering centre 21) is sufficiently small, the resulting signal represents mainly the total SPP intensity 80. This circumstance can be confirmed by measuring the detected signal at the film-air interface 74 and with the tip-interface distance of a few micrometers. When the fibre tip approaches the localised field at the interface, the localised field may now couple out to modes in the fibre, giving rise to light in the fibre which acts as a probe for the local field.

Figure 6:
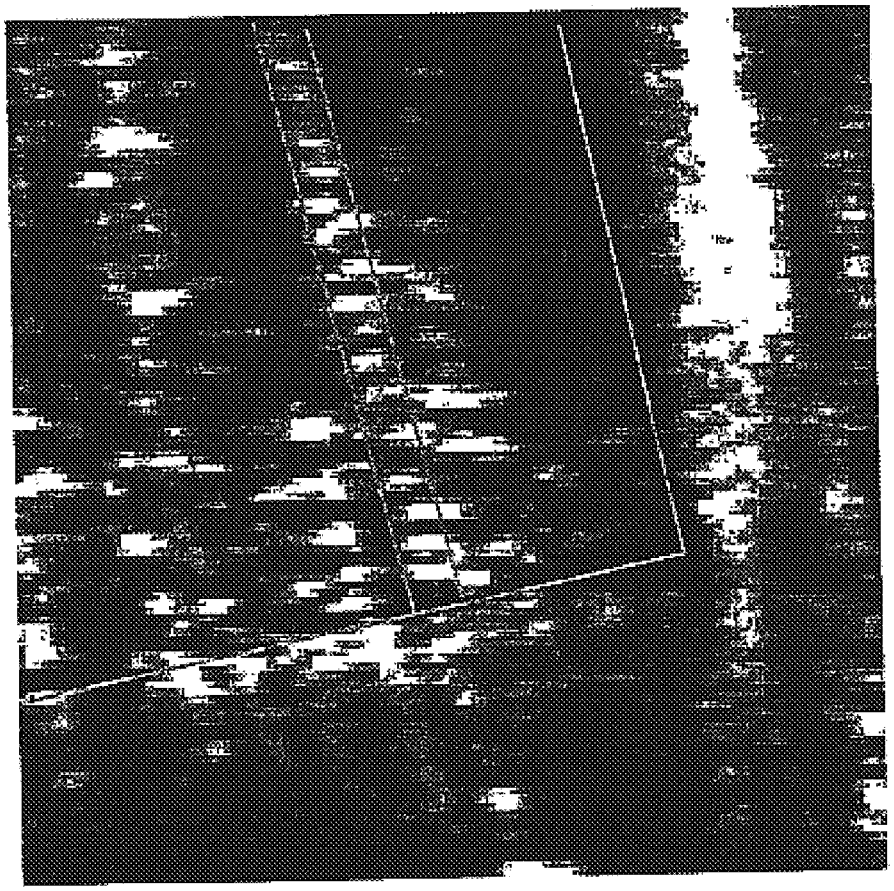
FIG. 6 is a near-field picture showing the total electric field amplitude of an SPP propagating in the waveguide of FIG. 3A or B.
Figure 6:

The near field imaging of SPP propagation in the PBG structure of FIG. 5 (made in glass and covered by 50-nm-thick layer of silver) with the spatial period of 400 nm has been performed by using a Ti:Sapphire tuneable laser and is shown in FIG. 6. The SPP was resonantly excited by adjusting the angle of incidence $\theta$ of laser beam at the wavelength of 792 nm. The detected optical signal with the fibre probe being in contact with the film-air interface 74 was more than 10 times larger than the signal detected with the fibre probe retrieved by a few micrometers from the interface. This indicates that the detected signal is dominated by the total SPP field intensity 80 implying that the near-field optical image shown in FIG. 6 represents the total SPP intensity distribution in the PBG structure.

FIG. 6 shows a pseudo grey-scale ("white" corresponds to the highest signal and "black" to the smallest one) representation of a near-field optical image with the size of 15×15 $\mu m^2$. The image was obtained with an un-coated optical fiber probe scanning along the surface of nano-structured 50-nm-thick silver film and with the SPP being resonantly excited at the wavelength of 792 nm according to FIG. 5. Black lines indicate the boundaries of a channel (of a flat surface) in the square containing a PBG hexagonal structure with the period of 400 nm. This image clearly demonstrates the effect of SPPBG waveguiding of the SPP excited at the wavelength corresponding to the band gap of the PBG structure, which should be centred around the wavelength twice the PBG period. A further optimisation of the structural parameters (film thickness, the depth of the surface profiling, the filling ratio) will allow for an improvement of the observed effect.

Experimental Verification

In the present description, we present direct observations (with a near-field optical microscope) of the SPPBG effect and SPP guiding along line deviations in SPPBG structures. In the following, we employ elastic SPP scattering within areas composed of scattering centres arranged periodically at the interface so that the SPP propagation inside these areas is inhibited for a certain range of wavelengths.

Figure 7:
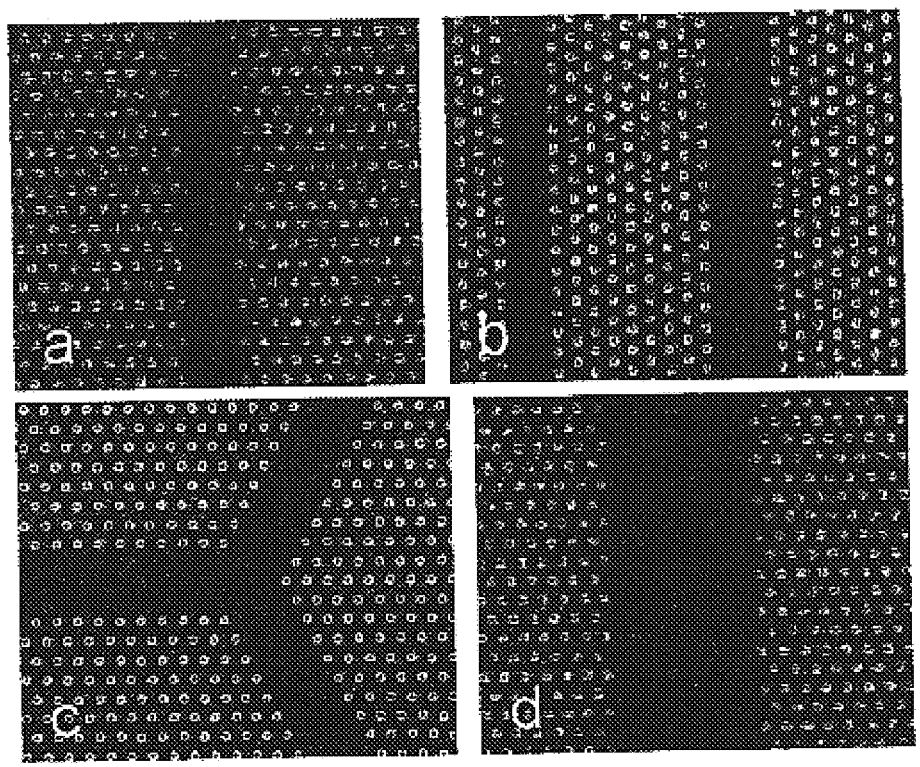
FIGS. 7A–D shows scanning electron microscope pictures of different regions of 400-nm-period triangular lattice with line deviations formed in a resist mask layer on a 45-nm-thick gold film.
Figure 8:
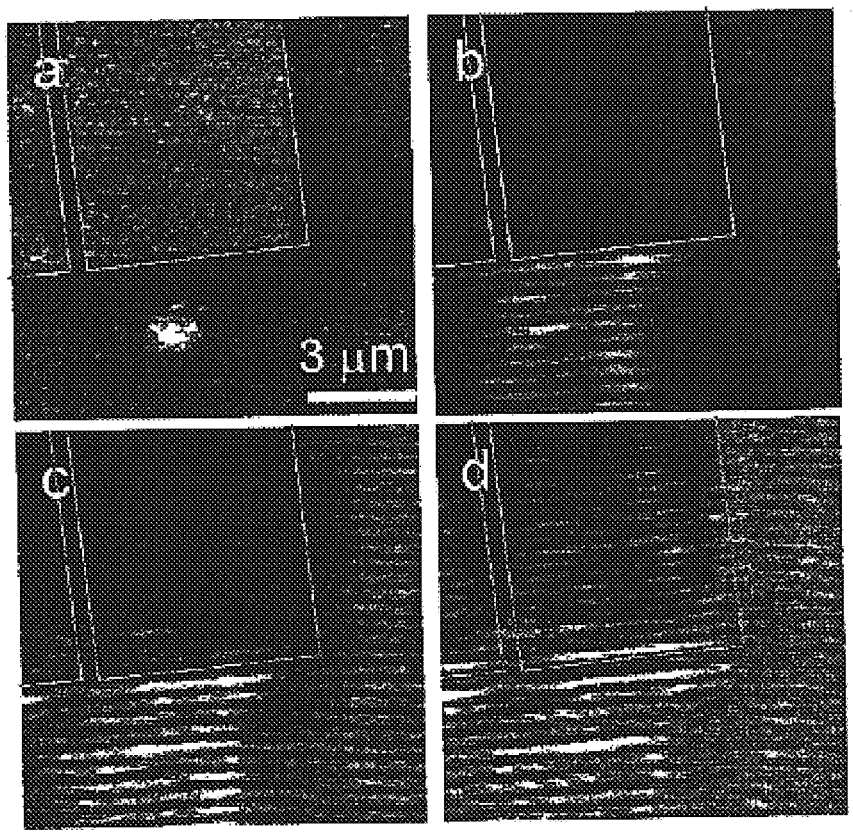
FIGS. 8A–D shows grey-scale: A topographical and near-field optical images (10.5×10.5 $\mu m^2$) taken at $\lambda \cong B$: 782, C: 792 and D: 815 nm. Periodic structure with a line deviation having ΓK orientation corresponds to the resist structure shown in FIG. 7A. Depth of the topographical image is 90 nm. Contrast, i.e., the relative difference between maximum and minimum detected optical signal, of the optical images is ~98%.

The experimental set-up consists of a stand-alone scanning near-field optical microscope (SNOM) used to collect the radiation scattered by an uncoated sharp fibre tip into fibre modes [4] and an arrangement for SPP excitation in the usual Kretschmann configuration (FIG. 1). SPPs are excited along a 45-nm-thick gold film that has been thermally evaporated on a glass substrate and whose surface has been covered with areas of a 400-nm-period triangular lattice of ~200-nm-wide and ~45-nm-high gold scattering centres (FIG. 7). This nano-patterning has been produced by using electron beam lithography on a resist layer on the gold film, evaporation of a second gold layer and lift-off. The fabricated structure contained line deviations of different widths and two main orientations, viz., ΓK (FIGS. 8A and 8D) and ΓM (FIGS. 8B and 8C), of the irreducible Brilloin zone of the lattice [1]. The p-polarised (FIG. 1) light beam from a Ti:Sapphire laser (λ=780–820 nm, P ~50 mW) is weakly focused (focal length ≈500 mm, spot size ~300 μm) onto the sample attached with immersion oil to the base of a glass prism. The SPP excitation is recognised as a minimum in the angular dependence of the reflected light power occurring at the angle θ determined by the phase matching condition: $\beta \cong (2\pi/\lambda)n \sin\theta$, where n is the refractive index of the prism [1]. The arrangement allows for an efficient SPP excitation in the range of 780–820 nm, when the angle of incidence is adjusted for optimum SPP excitation at 800 nm. The SPP characteristics evaluated in this range for an air-gold interface are as follows: $\epsilon_1=1$, $\epsilon_2 \approx -23+1.8i$, $\lambda_{SPP}=2\pi/Re(\beta) \approx 0.98\lambda$, $L_{SPP} \approx 35$ μm [1]. In the configuration used, the SPP propagation length gets further reduced due to the radiative damping (resonant re-radiation in the substrate) and inelastic SPP scattering out of the interface plane. The SPP excitation exhibited a well-pronounced resonance behaviour, and the average optical signal from the fibre was more than 10 times smaller if the incident angle was out of resonance or if the fibre tip was moved ~1 μm away from the sample interface. This means that the signal detected with the tip-interface distance maintained by shear force feedback is primarily related to the total SPP field intensity distribution along the film-air interface (and not to field components scattered out of the interface plane) [3]. Finally, it should be noted that all images of FIGS. 7–11 are oriented in the way that the excited SPP propagates upwards in the vertical direction.

The pronounced reflection by the periodic structure (FIG. 8A) of the excited SPP propagating approximately along ΓK direction has been observed on near-field optical images taken at λ≅782 nm (FIG. 8B). Very bright interference fringes seen in front of the structure along with a virtually zero signal just ~2 μm inside indicate its high reflectivity and strong damping of the incident SPP. The reflectivity and damping rapidly decrease with the increase of the light wavelength and the difference in the SPP intensity distributions inside and outside of the structure practically vanishes at λ≅815 nm (FIG. 8D). Such a drastic wavelength dependence of the SPP intensity inside the structure and its reflectivity represents, in our opinion, an unambiguous evidence of the SPPBG effect.

Figure 9:
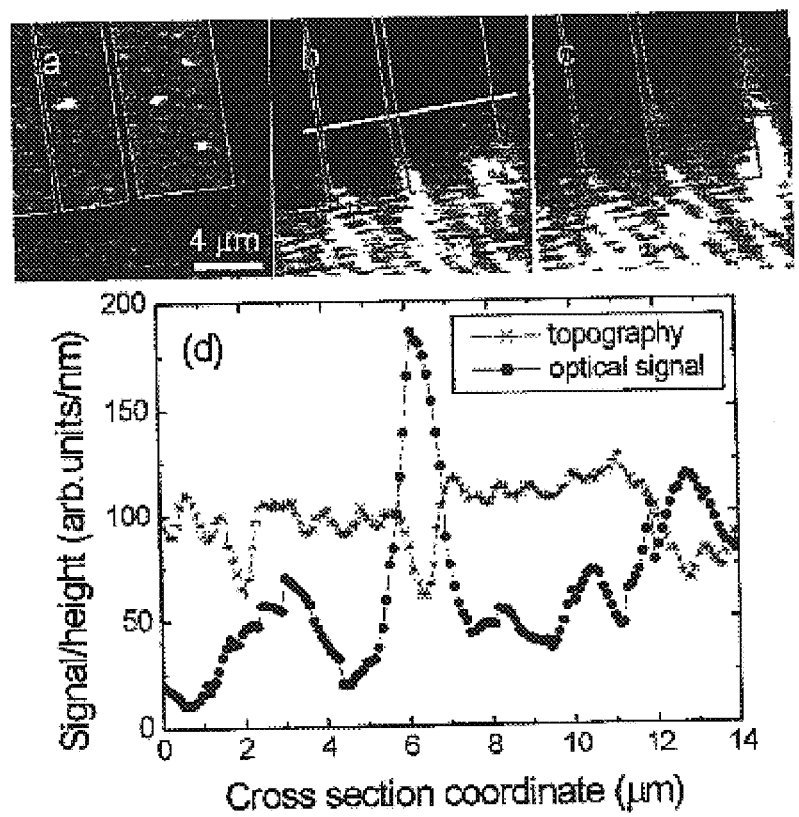
FIGS. 9A–D shows grey-scale A: topographical and near-field optical images (15×15 $\mu m^2$) taken at $\lambda \cong B$: 782, and C: 792 nm together with D: cross sections along the line marked on the corresponding optical image. Periodic structure with two line-deviations having ΓM orientation corresponds to the resist structure shown in FIG. 7B. Depth of the topographical image is 150 nm. Contrast of the optical images is ~97%.

Given the occurrence of the SPPBG effect, one may expect to observe at the corresponding wavelength the SPP guiding along a line deviation in the SPPBG structure. As it turned out, we found no evidence of SPP guiding along the line deviation of ΓK orientation (FIG. 8B) obtained by removing a chain of hexagonal clusters (FIG. 7A). This may seem surprising, but one should bear in mind that very little is known about 2D SPPBG structures on the theoretical side, probably because even the case of SPP scattering by an individual deviation requires elaborate simulations [5]. We found that the line deviation of ΓM orientation with nearly the same width (having 3 rows of scattering centres removed) does support the SPP guiding at 782 nm albeit only over a short distance of ~5 μm (FIG. 9). Note the SPPBG structure reflects efficiently the incident SPP at this wavelength but poorly at 792 nm. One can therefore conclude that the SPPBG effect is also present for ΓM orientation with the gap being centred close to 782 nm. Topographical and optical cross sections [FIG. 9D] taken ~4 μm inside the structure indicate that the SPPBG waveguide mode is well confined inside the waveguide, whose width is only ≈1.39 μm (FIG. 7B). At the same time, the neighbouring waveguide (having 2 rows of scattering centres removed and the width of ≈1.04 μm) does not support the guided mode even over a short distance. It seems that the width of the latter waveguide is below the cut-off value for the fundamental mode, whereas the width of the former is just above it. This can make the mode propagation very sensitive to the waveguide irregularities and account for the short propagation distance observed for this mode (FIG. 9B).

Figure 10:
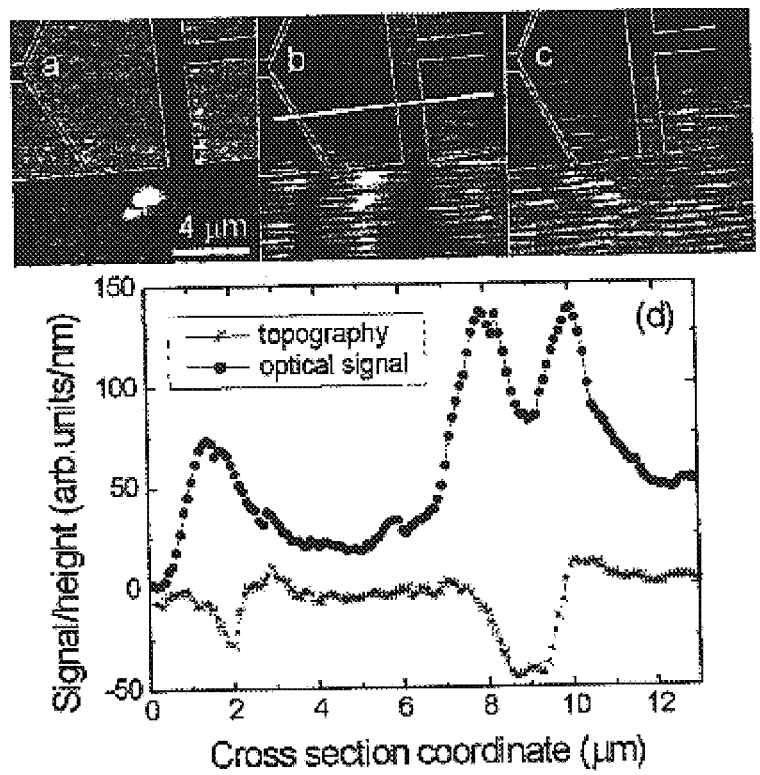
FIGS. 10A–D shows grey-scale A: topographical and near-field optical images (13×13 $\mu^2$) taken at $\lambda \cong B$: 782, and C: 815 nm together with D: cross sections along the line marked on the corresponding optical image. Periodic structure with the line deviation having ΓM orientation corresponds to the resist structure shown in FIG. 7c, whereas the wide deviation of ΓK orientation is shown in FIG. 7d. Depth of the topographical image is 170 nm. Contrast of the optical images is ~98%.
Figure 11:
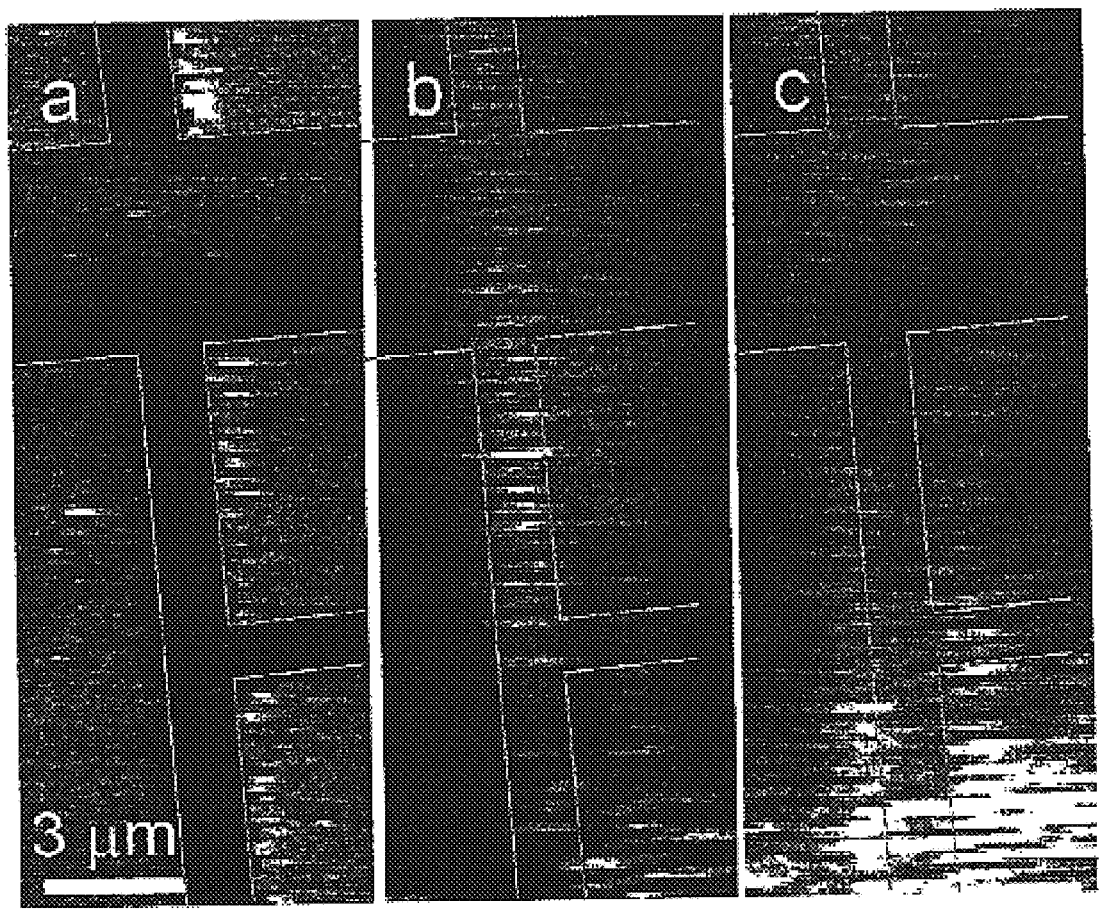
FIGS. 11A–C shows grey-scale A: topographical and near-field optical images (7×17.5 $\mu m^2$) taken at $\lambda \cong B$: 782, and C: 815 nm from the same interface area as the images shown in FIG. 10. Depth of the topographical image is 105 nm. Contrast of the optical images is (b) 95% and (c) 90%.

The above conjecture is supported by the images obtained with the SPPBG structure of ΓK orientation containing the line deviation along ΓM direction (FIG. 10). One can notice a weak mode (at 782 nm) propagating in this deviation that also has 3 rows of scattering centres removed (FIG. 7C). In addition, it is seen that a pronounced SPP beam propagates in a wide (~3.2 μm) channel (of ΓK orientation) between two SPPBG structures (FIG. 7D). Topographical and optical cross sections [FIG. 10D] taken ~4 μm inside the structure display clearly the intensity profiles of both the (fundamental) mode of the narrow SPPBG waveguide and a combination of (probably the first two) modes of the wide channel. Again, the SPP guiding in the line deviations and the SPP reflection of the SPPBG structure disappear when the wavelength increases to 815 nm (cf. FIGS. 5B and 5C). This propagation of the combination of modes in the wide SPPBG channel over ~18 μm without noticeable loss (FIG. 11) demonstrate the ability of line deviations in the SPPBG structures to efficiently guide SPP fields.

In summary, using near-field microscopy and SPP excitation in the Kretschmann geometry at the wavelength of 782 nm, we have directly observed strong reflection of the incident SPP by 400-nm-period triangular lattice structures (having ΓK and ΓM orientations) simultaneously with inhibition of the SPP propagation inside these structures. Strong deterioration of both the SPP reflection and inhibition of its propagation for larger wavelengths constitute, in our opinion, an unambiguous evidence of the SPPBG effect in the structures under consideration. We have also directly demonstrated SPP guiding (at 782 nm) along line deviations in the SPPBG structures. Unhindered propagation of SPP fields in the 3.2-μm-wide and 18-μm-long channel in the SPPBG structure has been observed. Further investigations and optimisation of the structural parameters will allow substantial improvement of the effects observed and exploration of the SPPBG-based components similar to those for conventional 2D PBG structures. Finally, usage of specialised diffraction gratings for coupling of radiation (eventually from optical fibres) into the SPP would open a direct way for realisation of integrated SPPBG circuits in the field of photonics.

The experimental verification provided above is a result of the preliminary devices according to the present invention. The devices according to the present invention are presently being further investigated, and even better experimental results offering a proof of principle is expected in the near future.

As described previously, SPPs suffer from losses due to radiation leaking from the SPP mode and due to various types of damping, all of which limit the propagation of SPPs in general and their wavelength resolution in particular.

In order to minimise losses of SPPs and thereby optimise the SPP propagation length and the wavelength definition in SPPBG waveguides, the following sections propose various structures in which the SPP losses can be reduced and/or compensated. This is especially important for light filtration purposes where damping limits the sharpness of a wavelength filter.

In the structures described previously, metal layers have been bounded by glass on one side and air on the other. Generally, the higher refractive index of the materials bounding the metal layer, the more of the SPP-wave will be pushed into the metal layer and the loss will increase correspondingly.

Figure 12:
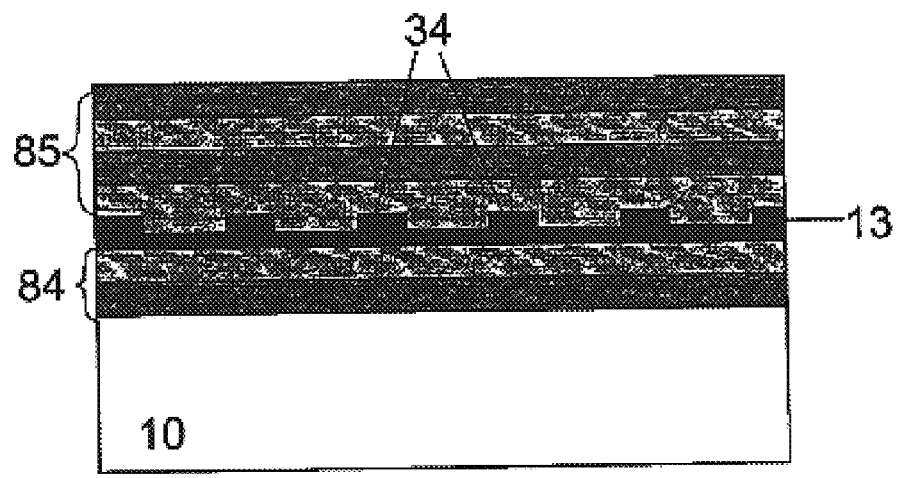
FIG. 12 shows a cross sectional view of a LR-SPP structure having dielectric multilayers.

FIG. 12 shows an alternative SPPBG structure having dielectric materials 84 and 85 of similar (not necessarily identical) refractive index on both sides of a very thin metal film 13 (typically 2–20 nm). The field will penetrate into the dielectrics on both sides and by reducing the metal layer thickness, a correspondingly smaller fraction of the SPP field will overlap with the metal film 13 whereby losses will be reduced. The obtained SPP modes have been described as Long-Range Surface Plasmon Polaritons (LR-SPP) in e.g. C-H. Liao et al., Resonant properties of LR-SPPs in an arbitrary multi-layer structure, Jpn. J. Appl. Phys. 38, 5938 (1999). Using this geometry can give an improvement of an order of magnitude in propagation length (reduced damping).

FIG. 12 shows a structure with a substrate 10 holding a LR-SPPBG structure consisting of a thin metal film 13 with bumps 34 incorporated into lower 84 and upper 85 arbitrary multi-layer dielectric structures. The dielectrics in the multilayers can be e.g. spin-coated polymers, $SiO_2$, $Si_3N_4$, water, index-matched liquids, air, etc., see also e.g. F. Pigeon et al., J. Appl. Phys. 90. 852 (2001), R. Charbonneau et al., Opt. Lett. 25, 844 (2000), S. Glasberg et al., Appl. Phys. Lett. 70. 1210 (1997), T. Sterkenburgh and H. Franke, J. Appl. Phys. 81, 1011 (1997). In the structure shown in FIG. 12. the modulation required to obtain an SPPBG effect can alternatively be formed by any of the methods described in relation to FIGS. 2A–F.

Figure 13A:
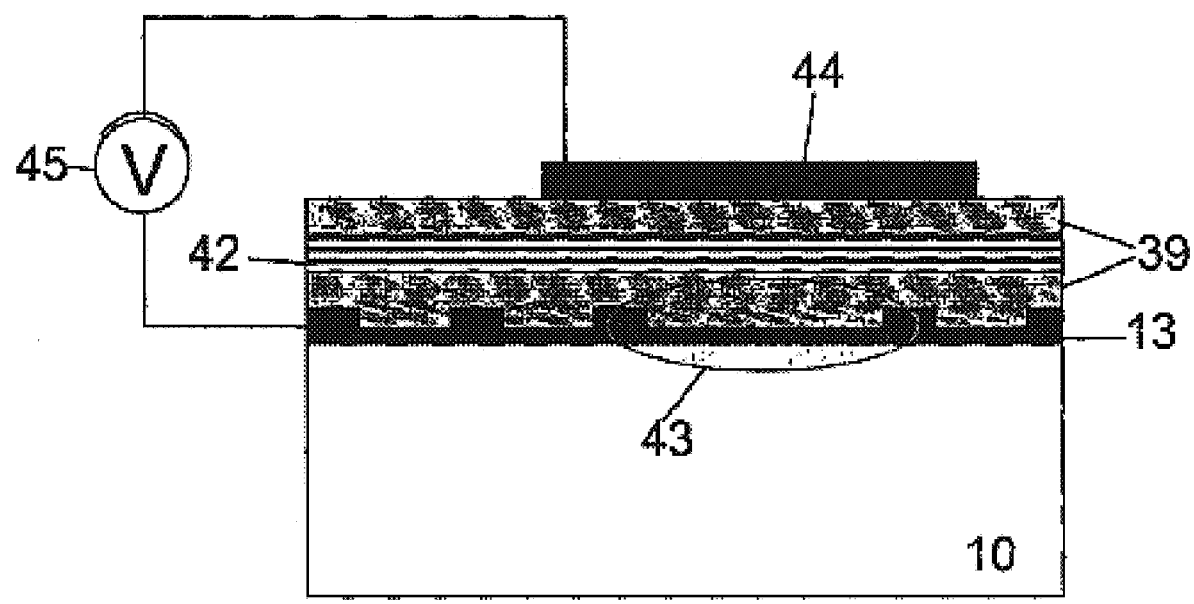
FIGS. 13 and 14 show cross sectional views of embodiments according to the present invention where the dielectric material comprises a gain medium for amplifying SPPs propagating on the interface.

In order to compensate for losses suffered by SPPs when propagating in prior art structures or in SPPBG structures, gain can be implemented in the SPPBG structure. Two possible configurations are sketched in FIGS. 13A and B. In FIG. 13A, a gain medium 42, typically containing an active layer such as a semiconductor containing quantum wells, is positioned between dielectric layers 39 on top of the metal film 13. Applying a power supply 45 between the film 13 and an electrode 44 sandwiching the active layer can electrically bias the active layer. SPPs propagating in the film 13 and having a significant field amplitude reaching in to the gain medium 42 will be amplified to compensate for the losses.

Figure 13B:
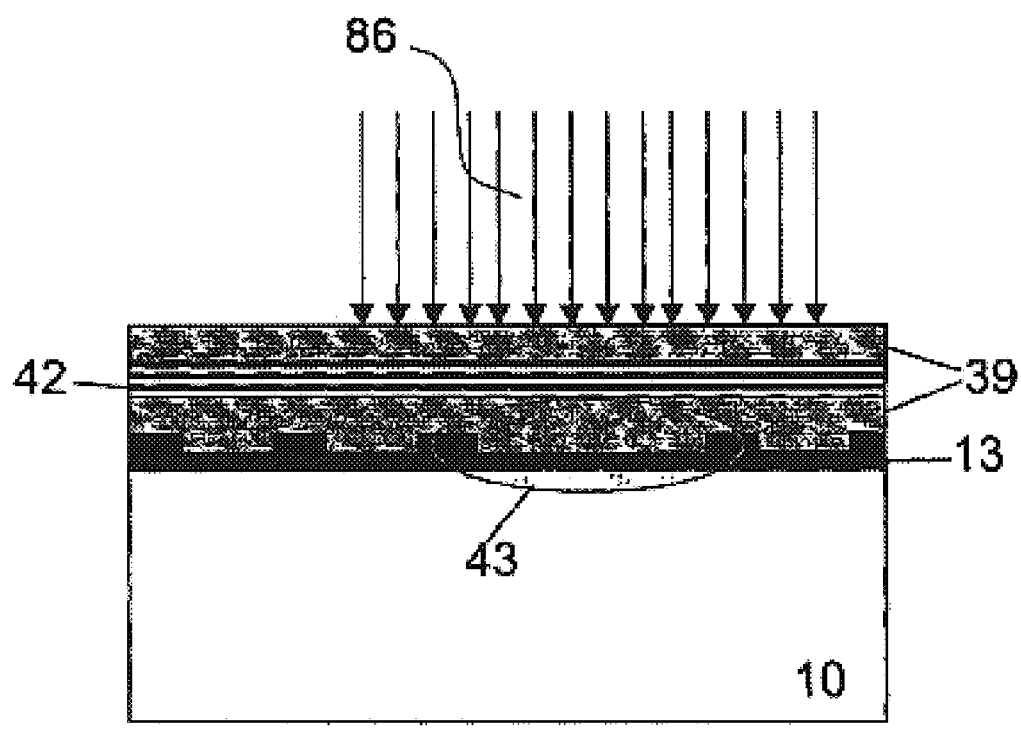

In FIG. 13B, the gain medium 42 could, for example, be erbium-doped glass which can be pumped optically, 86, if the upper dielectric layer is chosen to be transparent at the pumping wavelength. In the structures proposed in both FIGS. 13A and B, an SPPBG waveguide 43 extends in a directing perpendicular to the plane of the paper, an the gain medium 42 and/or the pumping (44/45 in FIG. 13A and 86 in FIG. 13B) may only be provided only in the region immediately above the waveguide 43 and along a short part of the waveguide.

Figure 14:
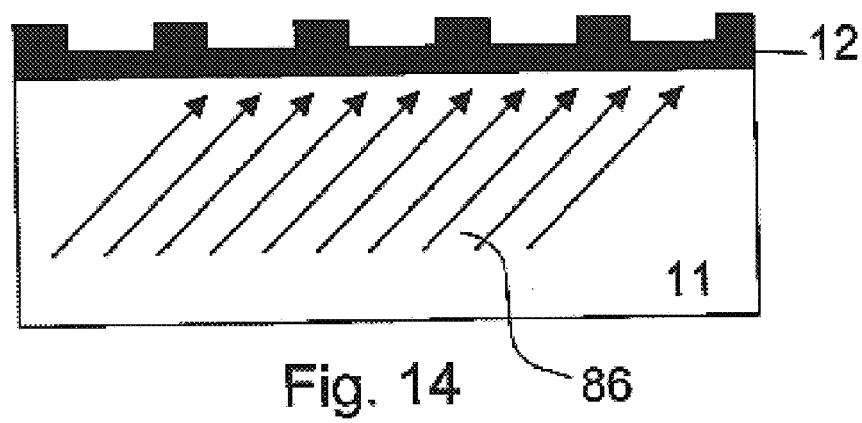

In an alternative structure, the loss could be compensated for by coherently pumping over the entire structure and thus continuously feeding energy into the SPP modes. Instead of exciting locally and letting the SPPs propagate away from the excitation part, the SPPs is exited and coherently pumped by the exciting radiation as they propagate. FIG. 14 shows a structure where the metal layer 12 is deposited on a material layer 11 which is transparent to the pumping radiation 86.

The examples for reducing or compensating for losses in SPP propagation given in the above may advantageously be combined so as to both reduce and compensate for losses or to provide a net gain in the device. Also, the examples may be combined with all the different SPPBG structures described, e.g. those described in relation to FIGS. 2A–F.

The possibilities for manipulating with the propagation properties of SPPs opens up for a number of SPP components which can be designed and fabricated using SSPBG waveguides, some of which will be described in the following in relation to FIGS. 15, 16, and 17. In the figures, the specific scattering centres forming the SPPBG are only illustrative, and may be formed in a variety of ways.

Figure 15:
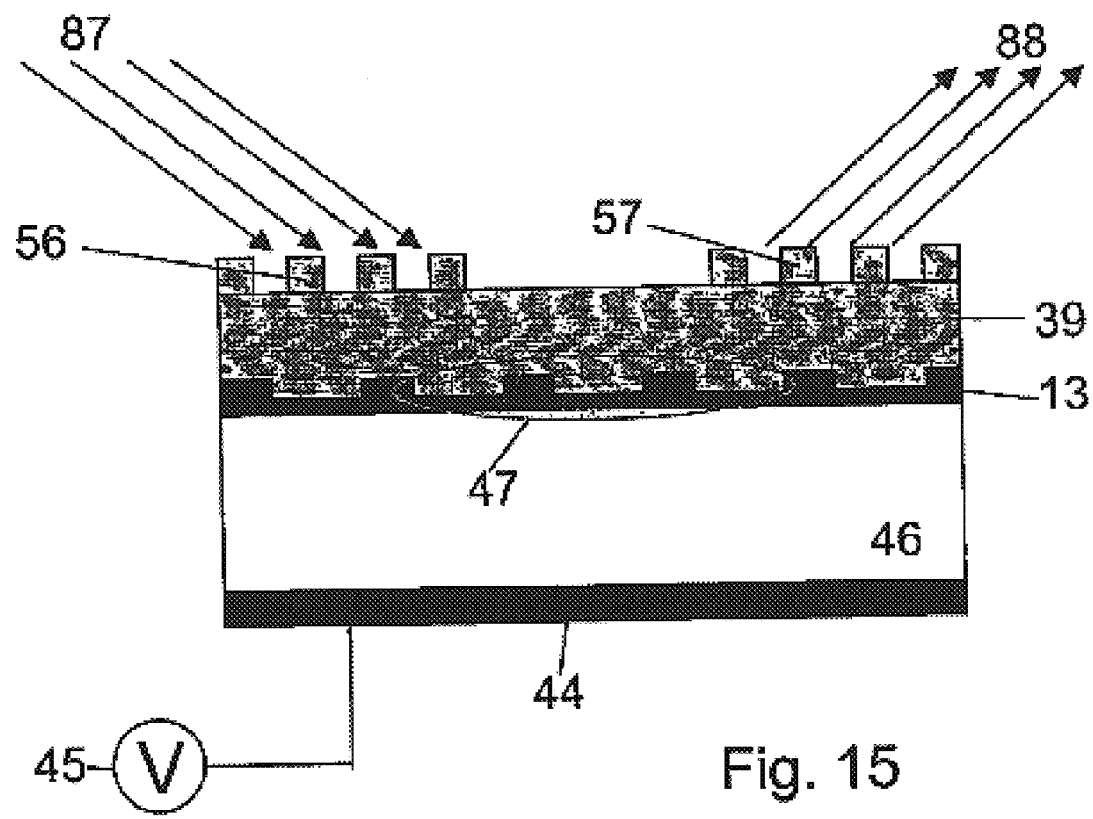
FIG. 15 shows a cross sectional view of an embodiment according to the present invention allowing for coherent distributed pumping of SPPs propagating on the interface.

FIG. 15 shows a tuneable filter based on SPPBG waveguides and/or cavities according to the present invention. An electro-optic layer 46 such as GaAs, $LiNbO_3$, $LiTaO_3$, KDP, ADP, is sandwiched between a thin metal film 13 with SPPBG structure and an electrode 44 connected to power supply 45. Grating coupler structures are formed in the upper surface of the top dielectric layer 39 for providing an input coupler 56 for coupling incoming broadband photons 87 to SPPs and an output coupler 57 for coupling SPPs to outgoing filtered photons 88. The input coupler 56 and the output coupler 57 are interconnected with a wavelength selective SPPBG structure. The refractive index of the electro-optic layer 46 can be varied by applying voltage which will change the transmission wavelength of the SPPBG structure. Thereby, the wavelength of photons that are coupled into the structure can be controlled electrically, resulting in a tuneable bandpass filter which could be applied for e.g. DWDM. A corresponding design has been proposed by P. J. Kajenski, (Tunable optical filter using long-range surface plasmons, Opt. Eng. 36, 1537 (1997)), but without any control of the SPP propagation in the plane of the metal film. The efficient guiding provided by the SPPBG waveguide 47 can greatly increase the functionality.

Figure 16:
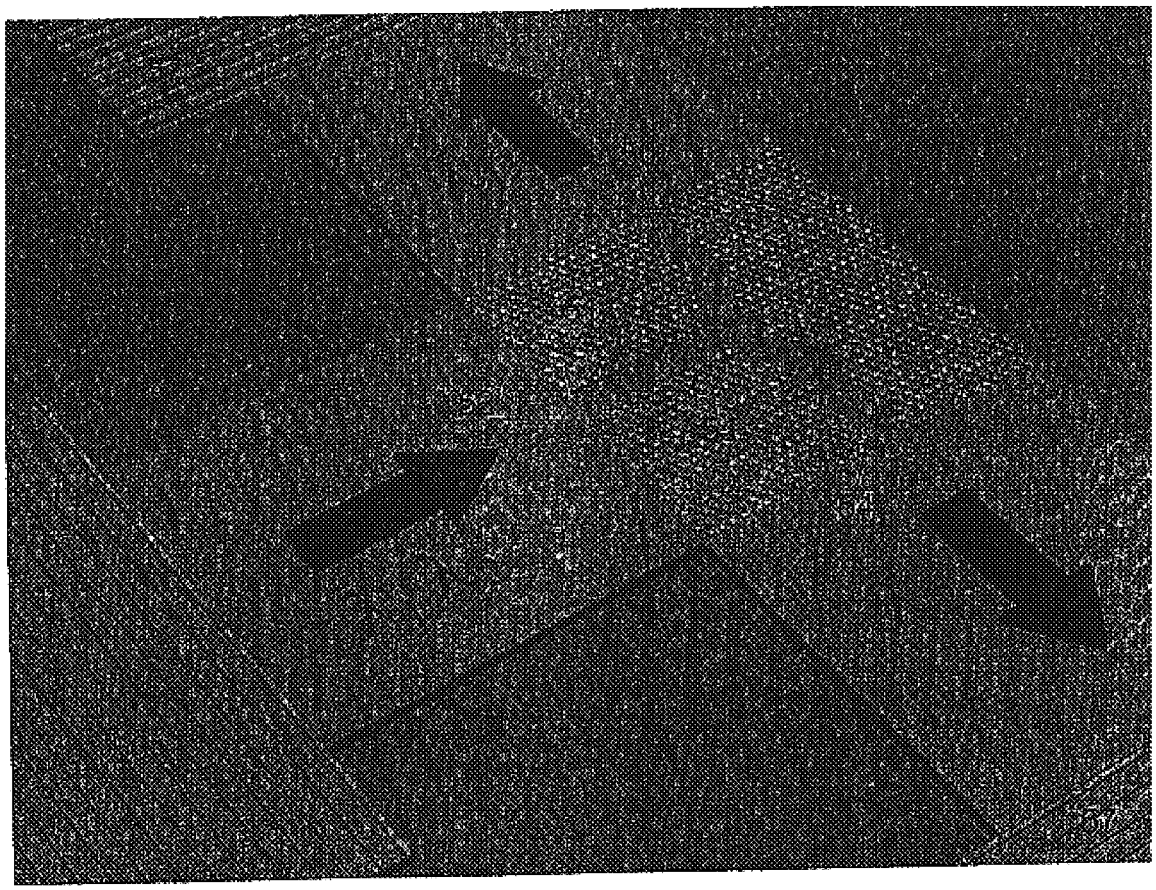
FIG. 16 is an illustration of an Y-coupler according to an embodiment of an SPPBG component of the present invention.

FIG. 16 shows a Y-junction defined by SPPBG regions of periodic structure 51. An SPP field comprising wavelengths $\lambda_1$ and $\lambda_2$ is propagating toward waveguide section 52 and will be split at the junction resulting in an SPP field propagating in sections 50 and 54. The splitting ratio is determined by the mode matching between the SPP field in section 52 to each of sections 50 and 54. This matching is determined by e.g. the widths of the waveguide sections and the angles of the junction.

The wavelengths of the incoming SPPs, $\lambda_1$ and $\lambda_2$, can originate from photonic signals coupled to SPPs by the grating coupler 56. This coupler can act as an interferometer. The resulting SPPs can be coupled back to photons at grating couplers similar to 56. Thus, both beams $\lambda_1$ and $\lambda_2$ are split into two components with a well-defined ratio.

SPPBG are expected to be extremely wavelength sensitive, a feature that can be exploited together with SPP waveguiding for fabrication of various components such as wavelength division multiplexing (WDM) structures for use in communication systems.

Thus, the splitter shown in FIG. 16 can be used as a high precision wavelength splitter, a "super prism", if the incoming SPPs $\lambda_1$ and $\lambda_2$ have different wavelength. By controlling the SPPBGs of the periodic structure 51 in regions abutting the waveguide regions 50 and 54, the SPPBG confining SPPs in waveguide region 50 may be tuned so that $\lambda_2$ lies outside the band gap. Similarly, the SPPBG defining waveguide region 54 may be tuned for $\lambda_1$ to lie outside the band gap. Controlling e.g. the periodicity of the periodic structures 51 during fabrication can control the SPPBGs. Alternatively, the SPPBGs can be controlled using electro-optic materials whereby the complex dielectric constant of the materials can be controlled electrically.

Figure 17:
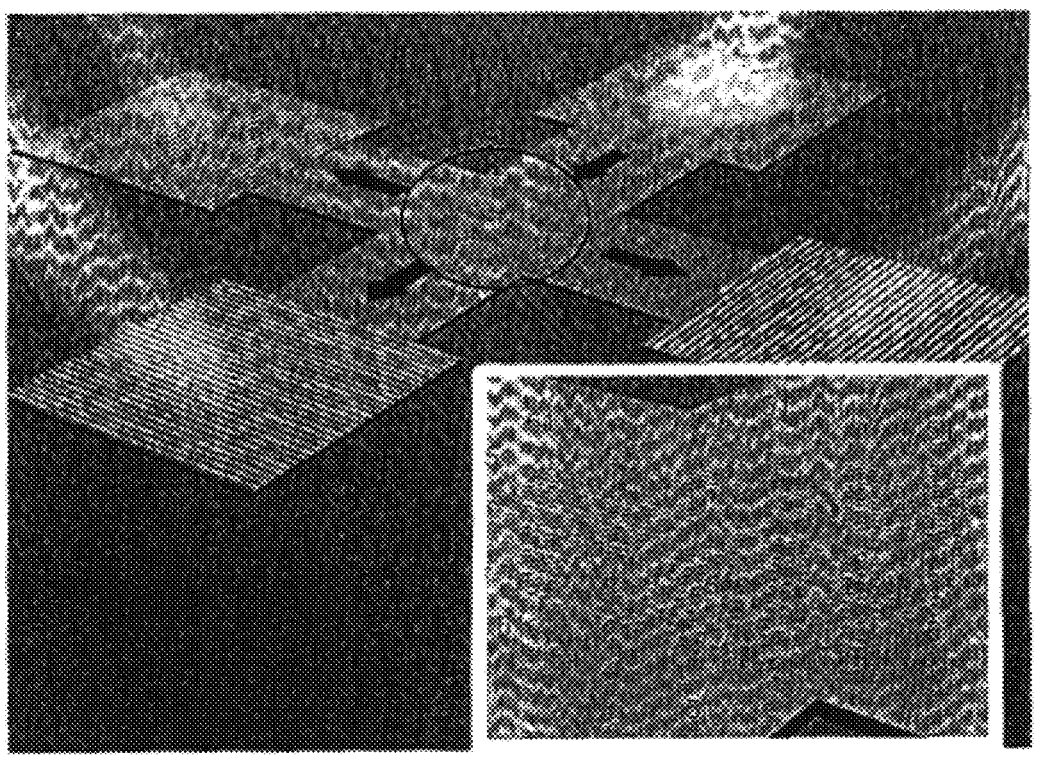
FIG. 17 is an illustration of a 3-way splitter according to an embodiment of an SPPBG component of the present invention.

FIG. 17 shows an SPPBG based optical component, a 3-way splitter, with one input metal grating 62 coupling incoming light signal 60 to SPP modes propagating towards the central SPPBG area 59 showed as a zoom in the inset. The SPPBG waveguide region 61 receives the incoming SPP and splits the power into 3 portions with SPPs propagating in waveguide regions 63, 65 and 67. Each waveguide region 63, 65 and 67 guides the SPPs towards the three output metal gratings 66 coupling the SPPs to light signals 64, 68 and 70 respectively. The output light signals can then be used in the optical transmission network after the processing in the SPPBG structure.

As in the Y-coupler described in relation to FIG. 16, the SPPBG regions defining each waveguide 63, 65 and 67 can be tuned to split the incoming SPP into three wavelength channels.

The Y-junction and the 3-way splitter described in relation to FIGS. 16 and 17 are examples of wavelength dependent guiding of SPPs. Another approach to wavelength dependent guiding is filters such as bends or reflectors (mirrors, beam-splitters). In a bend, SPPs having a wavelength outside the band gap will proceed into the SPPBG region and be absorbed due to various damping effects, and only SPPs having a wavelength within the band gap will be guided. In a reflector, SPPs having a wavelength within the band gap of the SPPBG region forming the reflector will be reflected whereas SPPs having a wavelength outside the band gap will be transmitted and can be guided further on the backside of the reflector. A reflector can be formed as a region of periodic structure within a waveguide, but having a different periodicity than the periodic structure defining the waveguide. Thereby the band gap of the reflector will be different from the band gap of the waveguide whereby SPPs having a wavelength within the wavelength overlap of the two band gaps will be reflected and other SPPs will be transmitted through the reflector.

Since an SPPBG waveguide can be formed simply by a periodic pattern with a conducting film, the waveguides and components can easily be formed on the same substrate in the same processing steps. This allows for smaller components which can be packed closer than traditional optical components. The feature of closer packing and smaller waveguides and components allows for smaller and thereby faster integrated circuits. Thus, implementation of SPP waveguiding will provide new possibilities for signal processing.

Couplers as described in relation to FIGS. 16 and 17, bends and reflectors can be used for ultra compact signal guiding and interconnects on optical chips. The strong wavelength dependent plasmon propagation can be used for wavelength division multiplexing (WDM) in communication systems. After the plasmon processing unit, the long distance transmission of the signal is performed by converting the plasmons to photons, e.g., by making use of a grating as in FIG. 17. This conversion can be highly efficient process. The typical channel splitting of 100 GHz in WDM systems allows an SSP linewidth of a few GHz which may be achieved using LR-SPPs (see e.g. Glasberg et al., Appl. Phys. Lett. 70, 1210 (1997) or J. C. Quail et al., Opt. Lett. 8, 377 (1983)).

Using the above-mentioned components, it is also possible to form Mach-Zender interferometers or other types of interferometers, which can be used for routing of SPPs for direct signal processing using interference effects. This is important e.g. for time-division multiplexing (TDM) in communication systems and for sensor applications is the SPP path length on the interferometer can be controlled, e.g. by using electro-optical materials or non-linear effects.

Leaving out, deforming, displacing or introducing a scattering centre in a periodic SPPBG structure can form a deviation in the 2-dimensional crystal. Such deviations may give rise to SPPBG cavities or deviation states localised on a sub-wavelength scale. Localisation of SPPs in deviation states in the plasmonic crystal can enhance the field strength locally by several orders of magnitude. Theoretically, continuous coupling of light into an SPPBG deviation state can enhance the field intensity of to a factor of $10^4$. This can seriously enhance the sensitivity of an SPP based sensor. Typically, such strong fields can be used for ultra sensitive applications such as single molecule (fluorescence) detectors or in biological/medical systems where the amount of material often is quite limited. Due to the nature of SPPs, the sensor provides an easy access to the high intensity regions peaking at the interface, such as on the surface of the sensor.

The present invention also provides active control of SPPs in SPPBG structures. The tuneable filter described in relation to FIG. 15 is a device with external active control in that the filter can be tuned electrically. A number of other embodiments providing active control are described in the following.

Since the propagation velocity of SPPs depends on the refractive index of the dielectric layer(s) holding the metal layer, phase shifts can easily be induced by modulating the refractive index of dielectric layers optically or electrically. This opens up for the application of SPPBG structures to make interferometers which can be used for e.g. gating, sampling, switching, regeneration, etc.

In another embodiment, at least part of a thin metal layer is held on a piezoelectric substrate whereby the dimensions and properties of the SPPBG structure could be controlled electrically. Equivalently, depositing the metal layer on a substrate with a large thermal expansion coefficient, the dimensions and properties of the SPPBG structure can be controlled by controlling the temperature, although this is a comparatively slow process.

Reversing the schemes of the embodiments described in the previous sections, SPPBG waveguides can be used as sensors for sensing material properties, electricity, pressure and temperature. SPPs have already been used for analysis of chemical substances. The SPP control provided by the present invention is expected to significantly improve those applications.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

References

[1] H. Raether, Surface Plasmons (Springer, Berlin, 1988).

[2] S. C. Kitson, W. L. Barnes, and J. R. Sambles, Phys. Rev. Lett. 77, 2670 (1997).

[3] S. I. Bozhevolnyi and F. A. Pudonin, Phys. Rev. Lett. 78, 2823 (1997); S. I. Bozhevolnyi and V. Coello, Phys. Rev. B 58, 10899 (1998).

[4] DME-DualScopeTM, Herlev, Denmark.

[5] A. V. Shchegrov, I. V. Novikov, and A. A. Maradudin, Phys. Rev. Lett. 78, 4269 (1997).

What is claimed is:

1. A device for guiding surface plasmon polaritons (SPPs) having a first frequency, said waveguide device comprising,
    a first medium having a first interface to a second medium, said interface being adapted to guide surface plasmon polaritons and being at least substantially plane, and
    a plurality of scattering centres, each scattering centre being a region whose cross section in a plane at least substantially parallel to the first interface is an area having a complex dielectric constant different from the complex dielectric constants of the surrounding areas in said plane,
    wherein projections of said scattering centres at least substantially perpendicularly onto the first interface define one or more non-transmitting parts and one or more transmitting parts on the first interface by forming predetermined, at least substantially periodic patterns of projected scattering centres in said non-transmitting parts, thereby making the non-transmitting parts SPPBG (surface plasmon polariton band gap) regions adapted to at least substantially prohibit the propagation of SPPs having the first frequency, and by not forming the predetermined pattern in the one or more transmitting parts, and
    wherein the plurality of scattering centres are positioned so as to define at least one transmitting part being at least partially surrounded by one or more non-transmitting parts on the first interface.

2. A device according to claim 1, wherein the at least one transmitting part forms an SPP waveguide in the one or more non-transmitting parts.

3. A device according to claim 1, wherein the at least one transmitting part forms an SPP cavity surrounded by one or more non-transmitting parts on the first interface and adapted to support standing SPP-waves.

4. A device according to claim 1, wherein the first medium has a first complex dielectric constant $\in_1$ with a negative real part, $\mathrm{Re}(\in_1)<0$, in a first frequency range, the device further comprising the second medium abutting the first interface of the first medium and having a second complex dielectric constant $\in_2$ with a positive real part, $\mathrm{Re}(\in_2)>0$, in a second frequency range, the first and second frequency ranges both comprising the first frequency.

5. A device according to claim 1, wherein the majority of the scattering centres are positioned within a region comprised by the first medium and being at least substantially parallel to the first interface.

6. A device according to claim 1, wherein the majority of the scattering centres are positioned within a region comprised by the second medium and being at least substantially parallel to the first interface.

7. A device according to claim 1, wherein the majority of the scattering centres are positioned at the first interface.

8. A device according to claim 1, wherein the majority of the scattering centres are positioned within a region comprised by a third medium adjacent to the second medium and being at least substantially parallel to the first interface.

9. A device according to claim 1, wherein the second medium comprises one or more dielectric materials selected from the group consisting of: $SiO_2$, air, polymers, spin-coated polymers, $Al_2O_3$ (sapphire), quarts, limeglass, $Si_3N_4$, water, index-matched liquids.

10. A device according to claim 1, wherein the first medium comprises one or more materials selected from the group consisting of: Au, Cu, Ag, Al, Cr, Ti, Pt, Ni, Ge, Si, Pd, superconductors.

11. A device according to claim 1, wherein the first medium comprises a thin conducting film supported by the second medium.

12. A device according to claim 1, wherein the second medium comprises a gain medium for coupling energy to SPP modes supported by the first interface, said gain medium being adapted to be electrically or optically pumped.

13. A device according to claim 1, wherein the second medium is at least substantially transparent to electromagnetic radiation of wavelength $\lambda$ so as to allow for irradiation of the first medium for pumping purposes.

14. A device according to claim 1, wherein a period of the at least substantially periodic pattern is within the intervals 2.5 nm–25 $\mu$m such as 2.5–250 nm or 250 nm–25 $\mu$m, preferably within the intervals 25–250 nm or 250–700 nm.

15. A device according to claim 1, wherein the period of the at least substantially periodic pattern is adjusted so that the SPPBG regions at least substantially prohibit the propagation of SPPs having a frequency within a frequency range corresponding to SPP wavelength intervals of 10 nm–100 $\mu$m such as 10–1000 nm or 1–100 $\mu$m, preferably within the intervals 100–1000 nm or 1000–3000 nm.

16. A device according to claim 1, wherein the plurality of scattering centres are positioned so as for no scattering centres to be projected onto the one or more transmitting parts of the first interface.

17. A device according to claim 1, wherein the plurality of scattering centres are positioned so as for the scattering centres projected onto the one or more transmitting parts of the first interface to form a pattern which is different from the predetermined pattern of the non-transmitting parts.

18. A device according to claim 1, wherein the device further comprises one or more input coupling structures for coupling photons to SPPs in a controlled manner.

19. A device according to claim 1, wherein the device further comprises one or more output coupling structures for coupling SPPs to photons in a controlled manner.

20. An SPP component comprising an SPP receiving part comprising an input coupling structure for coupling photons to SPPs and one or more SPP waveguides according to claim 2.

21. An SPP component according to claim 20, further comprising at least one active region having a controllable complex refractive index for inducing phase and/or amplitude modulations in guided SPPs, the SPP component further comprising means for controlling the complex refractive index of the active region.

22. An SPP component according to claim 20, wherein the one or more SPP guiding devices form an interferometer comprising the at least one active region.

23. An SPP component according to claim 20, further comprising a further non-transmitting part being an SPPBG region adapted to at least substantially prohibit the propagation of SPPs having a frequency different from the first frequency, which further non-transmitting part forms a wavelength filter.

24. An SPP circuit for processing SPP signals, said circuit comprising:
   an input structure for coupling photons to SPPs,
   at least one output structure for coupling SPPs to photons,
   one or more SPP components according to any of claims 20–23, and
   two or more SPPBG waveguides according to claim 2 for guiding SPPs from the input structure to one of the one or more SPP components, and for guiding SPPs from one of the one or more SPP components to the at least one output structure.

25. A method for controlling the propagation of surface plasmon polaritons (SPPs) propagating on an at least substantially planar interface between a first and a second medium, said method comprising the steps of:
   providing the first medium, the first medium comprising a first material layer having a first complex dielectric constant $\in_1$ with a negative real part, $\text{Re}(\in_1)<0$, in a first frequency range and having a first surface abutting the interface,
   providing the second medium, the second medium having, in at least some parts abutting the interface, a second complex dielectric constant $\in_2$ with a positive real part, $\text{Re}(\in_2)>0$, in a second frequency range at least in one or more parts abutting the interface,
   propagating an SPP at the interface, said SPP having a first frequency comprised in the first and second frequency range,
   defining a propagation layer comprising the interface and surrounding regions, wherein every point is subject to an electromagnetic field of the SPP having a strength not less than 1% of an electromagnetic field at the interface when the SPP propagates on the part of the interface closest to the point, and
   confining the SPP to a transmitting part of the interface by providing one or more non-transmitting parts of the interface being SPPBG (surface plasmon polariton band gap) regions at least substantially inaccessible to SPPs having a frequency within a third frequency range comprising the first frequency, said SPPBG regions being defined by a plurality of scattering centres in the propagation layer forming a predetermined, at least substantially periodic pattern when projected at least substantially perpendicularly onto the first interface, each scattering centre being a region whose cross section, in a plane at least substantially parallel to the interface, is an area having one or more complex dielectric constants different from the complex dielectric constant of the surrounding areas in said plane.

26. A method according to claim 25, wherein the step of confining the SPP to the transmitting part of the interface further comprises the steps of,
   propagating the SPP on the transmitting part of the interface, and
   whenever the SPP propagates from the transmitting part of the interface into a non-transmitting part of the interface, then reflecting at least part of the SPP on the non-transmitting part of the interface and propagating the reflected part of the SPP on the transmitting part of the interface.

27. A method according to claim 25, wherein the transmitting part of the interface comprises a pattern of projected scattering centres different from the predetermined pattern.

28. A method according to claim 25, wherein the transmitting part of the interface is at least substantially void of projected scattering centres.

29. A method according to claim 25, wherein the scattering centres are structures formed at the interface in the first and/or second media.

30. A method according to claim 25, further comprising the step of forming the SPP by coupling one or more photons to the interface.

31. A method according to claim 25, further comprising the step of coupling at least part of the SPP to one or more photons.

32. A method according to claim 25, further comprising the step of propagating a second SPP on the interface, said second SPP having a second frequency outside the third frequency interval.

33. A method according to claim 32, wherein the step of confining the SPP to the transmitting part of the interface further comprises the step of propagating the second SPP on one of the one or more non-transmitting parts of the interface.

34. A method according to claim 25, further comprising the steps of
   providing a gain medium in the second medium for coupling energy to SPP modes supported by the first interface, said gain medium defining a transmitting part of the first interface when projected perpendicularly onto the first interface,
   pumping the gain medium electrically or optically, and
   amplifying the guided SPP by coupling energy from the gain medium to the mode containing the SPP.

35. A method for manufacturing a device for controlling the propagation of a SPP (surface plasmon polariton) having a first frequency and propagating on an at least substantially planar interface, said method comprising the steps of:
   providing a substrate having an at least substantially planar surface,
   forming, in one or more parts of the substrate surface, a predetermined and at least substantially periodic pattern of structures which are concave or convex with respect to the substrate surface so as to define one or more non-transmitting parts of an interface between the substrate and a first material layer to be held by the substrate surfaces,
   providing the first material layer abutting the substrate surface so as to form convex or concave structures in the first layer which are associated with the concave or convex structures of the substrate surface, the first material layer having a complex dielectric constant $\in_1$ with a negative real part, $\text{Re}(\in_1)<0$, in a first frequency range comprising the first frequency, said at least substantially planar interface being an upper or a lower surface of the first material layer,
   wherein the interface is adapted to support the propagation of SPPs, and wherein the one or more non-transmitting parts of the interface forms one or more surface plasmon polariton band gap regions on the interface, and
   wherein the pattern of structures is formed to define one or more transmitting parts on the interface without said predetermined pattern, and so that said one or more non-transmitting parts at least partly surround said one or more transmitting parts to form an SPP waveguide in the non-transmitting parts of the interface.

36. A method for manufacturing a device for controlling the propagation of an SPP (surface plasmon polariton)

having a first frequency and propagating on an at least substantially planar interface, said method comprising the steps of:

provoking a first material layer having a complex dielectric constant $\in_1$ with a negative real part, $\text{Re}(\in_1)<0$, in a first frequency range comprising the first frequency, said at least substantially planar interface being a plane associated with an upper or a lower surface of the first material layer, and removing, or altering the complex dielectric constant of, selected regions of the first layer so as to form a predetermined, at least substantially periodic pattern of selected regions in the first layer, the selected regions thereby obtaining a complex dielectric constant different from $\in_1$, wherein the selected regions define, in the interface, one or more non-transmitting parts with said at least substantially periodic pattern and one or more transmitting parts without said at least substantially periodic pattern, wherein the interface is adapted to support the propagation of SPPs, and wherein the one or more non-transmitting parts of the interface forms one or more surface plasmon polariton band gap regions on the interface, and wherein said one or more non-transmitting parts at least partly surround the one or more transmitting parts of the interface.

37. A method according to claim 39, wherein the pattern of regions is formed so as to define one or more transmitting parts forming an SPP waveguide in the non-transmitting parts of the interface.

38. A method according to claim 39, wherein the pattern of regions is formed so as to define one or more transmitting parts forming an SPP cavity in the non-transmitting parts of the interface.

39. A method for manufacturing a device for controlling the propagation of an SPP (surface plasmon polariton) having a first frequency and propagating on an at least substantially planar interface between a material layer and a medium, said method comprising the steps of:

providing the substrate having a surface abutting the material layer, the substrate having a complex dielectric constant $>_2$ with a positive real part, $\text{Re}(\in_2)\in 0$, in a second frequency range comprising the first frequency, and altering the complex dielectric constant of a plurality of regions in the substrate to a complex dielectric constant different from $\in_2$, said plurality of regions being positioned so as to, when projected at least substantially perpendicularly onto the interface, form one or more predetermined, at least substantially periodic patterns defining one or more non-transmitting parts of the interface.

providing the material layer on the surface of the substrate, said material layer having a first complex dielectric constant $\in_1$ with a negative real part, $\text{Re}(\in_1) <0$, in a first frequency range comprising the first frequency and having an upper and a lower surface, the interface being defined as the plane associated with the upper or the lower surface of the material layer, wherein the one or more predetermined patterns define one or more transmitting parts of the interface without the predetermined pattern, said transmitting parts being at least partly surrounded by the one or more non-transmitting parts.

40. A method according to claim 43, wherein the medium forming the interface with the material layer is the substrate.

41. A method according to claim 43, wherein the interface is adapted to support the propagation of SPPs, and wherein the one or more non-transmitting parts of the interface provides one or more SPPBG (surface plasmon polariton band gap) regions in the interface.

42. A method according to claim 43, wherein the substrate comprises one or more material layers.

43. A method according to claim 43, wherein the plurality of regions are positioned so as to define one or more transmitting parts forming an SPP waveguide in the non-transmitting parts on the interface.

44. A method according to claim 43, wherein the plurality of regions are positioned so as to define one or more transmitting parts forming an SPP cavity in the non-transmitting parts on the interface.

45. A method for manufacturing a device for controlling the propagation of a SPP (surface plasmon polariton) having a first frequency and propagating on an at least substantially planar interface, said method comprising the steps of:

providing a substrate having an at least substantially planar surface.

forming, in one or more parts of the substrate surface, a predetermined and at least substantially periodic pattern of structures which are concave or convex with respect to the substrate surface so as to define one or more non-transmitting parts of an interface between the substrate and a first material layer to be held by the substrate surface, providing the first material layer abutting the substrate surface so as to form convex or concave structures in the first layer which are associated with the concave or convex structures of the substrate surface, the first material layer having a complex dielectric constant $\in_1$ with a negative real part, $\text{Re}(\in_1)<0$, in a first frequency range comprising the first frequency, said at least substantially planar interface being an upper or a lower surface of the first material layer.

wherein the interface is adapted to support the propagation of SPPs, and wherein the one or more non-transmitting parts of the interface forms one or more surface plasmon polariton band gap regions on the interface, and wherein the pattern of structures is formed to define one or more transmitting parts on the interface without said predetermined pattern, and so that said one or more non-transmitting parts at least partly surround said one or more transmitting nails to form an SPP cavity in the non-transmitting parts of the interface.

* * * * *